US009811834B2

(12) United States Patent
Johnson

(10) Patent No.: US 9,811,834 B2
(45) Date of Patent: Nov. 7, 2017

(54) SYSTEM AND METHOD FOR PROVIDING DIGITAL CONTENT

(71) Applicant: Provo Craft and Novelty, Inc., South Jordan, UT (US)

(72) Inventor: Jonathan Aaron Johnson, Orem, UT (US)

(73) Assignee: Provo Craft and Novelty, Inc., South Jordan, UT (US)

( * ) Notice: Subject to any disclaimer, the term of this patent is extended or adjusted under 35 U.S.C. 154(b) by 483 days.

(21) Appl. No.: 13/969,178

(22) Filed: Aug. 16, 2013

(65) Prior Publication Data
US 2013/0339260 A1    Dec. 19, 2013

Related U.S. Application Data

(63) Continuation of application No. 12/773,489, filed on May 4, 2010, now abandoned.

(60) Provisional application No. 61/175,429, filed on May 4, 2009.

(51) Int. Cl.
| | | |
|---|---|---|
| *G06Q 30/00* | (2012.01) | |
| *G06Q 10/04* | (2012.01) | |
| *G06Q 10/10* | (2012.01) | |
| *G06Q 30/06* | (2012.01) | |

(52) U.S. Cl.
CPC ....... *G06Q 30/0185* (2013.01); *G06Q 10/043* (2013.01); *G06Q 10/10* (2013.01); *G06Q 30/06* (2013.01)

(58) Field of Classification Search
CPC ........... G06Q 30/0601–30/0645; G06Q 30/08; G06Q 30/0185; G06Q 30/06; G06Q 10/043; G06Q 10/10

USPC ................................................ 705/26.1–27.2
See application file for complete search history.

(56) References Cited

U.S. PATENT DOCUMENTS

| | | | |
|---|---|---|---|
| 7,054,708 B1 | 5/2006 | Aamodt et al. | |
| 2005/0144253 A1* | 6/2005 | Yoshino | ................... G06F 21/10 709/217 |
| 2006/0200267 A1 | 9/2006 | Aamodt et al. | |
| 2009/0000437 A1 | 1/2009 | Johnson et al. | |
| 2009/0055722 A1* | 2/2009 | Eorgoff | .................... G06F 17/21 715/211 |
| 2009/0300526 A1 | 12/2009 | Port | |

(Continued)

OTHER PUBLICATIONS

Digital Art Solutions, www.smartdesigns.com, dated Nov. 6, 2006 and submitted in related U.S. Appl. No. 11/457,413.*

(Continued)

*Primary Examiner* — Michael Misiaszek
*Assistant Examiner* — Katherine O'Sullivan
(74) *Attorney, Agent, or Firm* — Honigman Miller Schwartz and Cohn LLP

(57) ABSTRACT

A method of delivering digital content for use on an electronic cutting machine. The method includes displaying at least one themed project in a rich internet application, where the themed project has at least one glyph of a glyph collection. The method further includes providing access to the rich internet application over a network and offering purchased access to the glyph collection. Any glyphs of the glyph collection can be added to the themed project. The themed project is cuttable on an electronic cutting machine in communication with the rich internet application.

24 Claims, 16 Drawing Sheets

(56) References Cited

U.S. PATENT DOCUMENTS

2010/0217427 A1     8/2010   Gray et al.
2010/0256794 A1* 10/2010   McLaughlin ...... G05B 19/4183
                                                                                                    700/110

OTHER PUBLICATIONS

Digital Art Solutions, www.smartdesigns.com, dated Nov. 6, 2006 and submitted in U.S. Appl. No. 11/457,413.
Non-Final Office Action dated Aug. 31, 2012, relating to U.S. Appl. No. 12/773,489.
Final Office Action dated Feb. 19, 2013, relating to U.S. Appl. No. 12/773,489.

* cited by examiner

SYSTEM AND METHOD FOR PROVIDING DIGITAL CONTENT

CROSS REFERENCE TO RELATED APPLICATIONS

This Application is a Continuation of application Ser. No. 12/773,489 filed on May 4, 2010, which claims the benefit of U.S. Provisional Application 61/175,429 filed on May 4, 2009. The entire contents of these applications are incorporated herein by reference in their entirety.

TECHNICAL FIELD

This disclosure relates to systems and methods of delivering digital content for use on electronic cutting machines.

BACKGROUND

The scrapbook industry has provided consumers with various tools, such as mechanical cutting and embossing tools, as well as electronic cutting machines. These tools and machines may be used to create designs for personalizing books and journals, such as may be desired to memorialize events and memories. Scrap booking software may be used to create designs for cutting on the mechanical cutting tools. Generally, scrap booking software provides rudimentary design capabilities and/or is incapable of interacting with electronic cutting machines.

Software applications, such as rich internet applications (RIAs), which are web applications that generally have the features and functionality of traditional desktop applications, may include client and server portions for execution on a respective client computing device and a server computing device. RIAs typically form a stateful client application with a separate services layer on the backend. RIAs typically run in a web browser, or do not require software installation on a local machine, and run locally in a secure environment called a sandbox. A sandbox is generally a security mechanism for safely running programs. Sandboxes are often used to execute untested code, or non-trusted programs from unverified third-parties, suppliers and non-trusted users.

SUMMARY

One aspect of the disclosure provides a method of delivering digital content for use on an electronic cutting machine. The method includes displaying at least one themed project in a rich internet application, where the themed project has at least one glyph of a glyph collection. The method further includes providing access to the rich internet application over a network and offering purchased access to the glyph collection. Any glyphs of the glyph collection can be added to the themed project. The themed project is cuttable on an electronic cutting machine in communication with the rich internet application.

Implementations of the disclosure may include one or more of the following features. In some implementations, the method includes executing the rich internet application on a cloud client of a cloud computing scheme. The digital content may be delivered on demand to the rich internet application from the cloud client. The themed project may include an arrangement of at least one of glyphs and placeholders for glyphs according to a theme. The method may include providing at least one design creation tool in the rich internet application for editing the themed project. Executing the at least one design creation tool may include at least one of cutting, copying, pasting, kerning for moving glyphs together, glyph welding for merging glyphs together, glyph sizing, glyph orienting, glyph slanting, glyph grouping, glyph ungrouping, glyph compositing for combining sub-glyphs into a single glyph, glyph exploding for breaking a glyph into constituent sub-glyphs, glyph flipping about an axis, glyph layering, glyph shadowing, and setting a glyph border.

Another aspect of the disclosure provides another method of delivering digital content for use on an electronic cutting machine. The method includes providing access to a rich internet application over a network, where the rich internet application provides at least one design creation tool for manipulating glyphs cuttable on an electronic cutting machine. The method also includes offering membership access to a club portion of the rich internet application and receiving at least one club project from at least one member of the club portion. The method includes displaying the at least one club project on the rich internet application and offering purchased access to the glyph collection. The at least one club project includes at least one glyph of a glyph collection.

Implementations of the disclosure may include one or more of the following features. In some implementations, the method includes executing the rich internet application on a cloud client of a cloud computing scheme. The method may include offering purchased access to the at least one club project for cutting on an electronic cutting machine in communication with the rich internet application. A service fee can be assessed for member-to-member usage of the at least one club project. Moreover, the club project may include at least one of an arrangement of glyphs and placeholders for glyphs.

In some implementations, executing the at least one design creation tool includes at least one of cutting, copying, pasting, kerning for moving glyphs together, glyph welding for merging glyphs together, glyph sizing, glyph orienting, glyph slanting, glyph grouping, glyph ungrouping, glyph compositing for combining sub-glyphs into a single glyph, glyph exploding for breaking a glyph into constituent sub-glyphs, glyph flipping about an axis, glyph layering, glyph shadowing, and setting a glyph border.

The method may include controlling access to the club portion of the rich internet application. In some examples, the method includes receiving credit card information from a user for verifying user identification.

An aspect of the disclosure provides yet another method of delivering digital content for use on an electronic cutting machine. The method includes displaying digital content for ranking by users and receiving a user ranking for the digital content by each of the users. The method further includes determining a content ranking for the digital content based on the received user rankings and displaying the digital content to each user based on at least one of the content ranking and the user ranking of the respective user. The digital content includes at least one glyph cuttable on an electronic machine.

Implementations of the disclosure may include one or more of the following features. In some implementations, the method includes displaying the digital content in a rich internet application over a network. For example, the method can include executing the rich internet application on a cloud client of a cloud computing scheme. In some implementations, the method includes statistically analyzing the user rankings for determining the content ranking.

The method may include tracking at least one of browsing and usage of the digital content for creating designs and displaying the digital content based on the tracked usage of the digital content. Marketing information can be displayed based on at least one of the user ranking, content ranking, and the tracked usage of the digital content.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure provides design software that allows a user to create, design, review, and/or modify projects (e.g., scrap book designs). The projects can be realized by cutting the designs on an electronic cutting machine. Users may wish to create or add to scrap designs at his/her leisure in various locations and at various times. Design software that provides the user with design creation tools, content access, and/or portable access allows the user to maximize creative moments to create designs.

Figure 1:
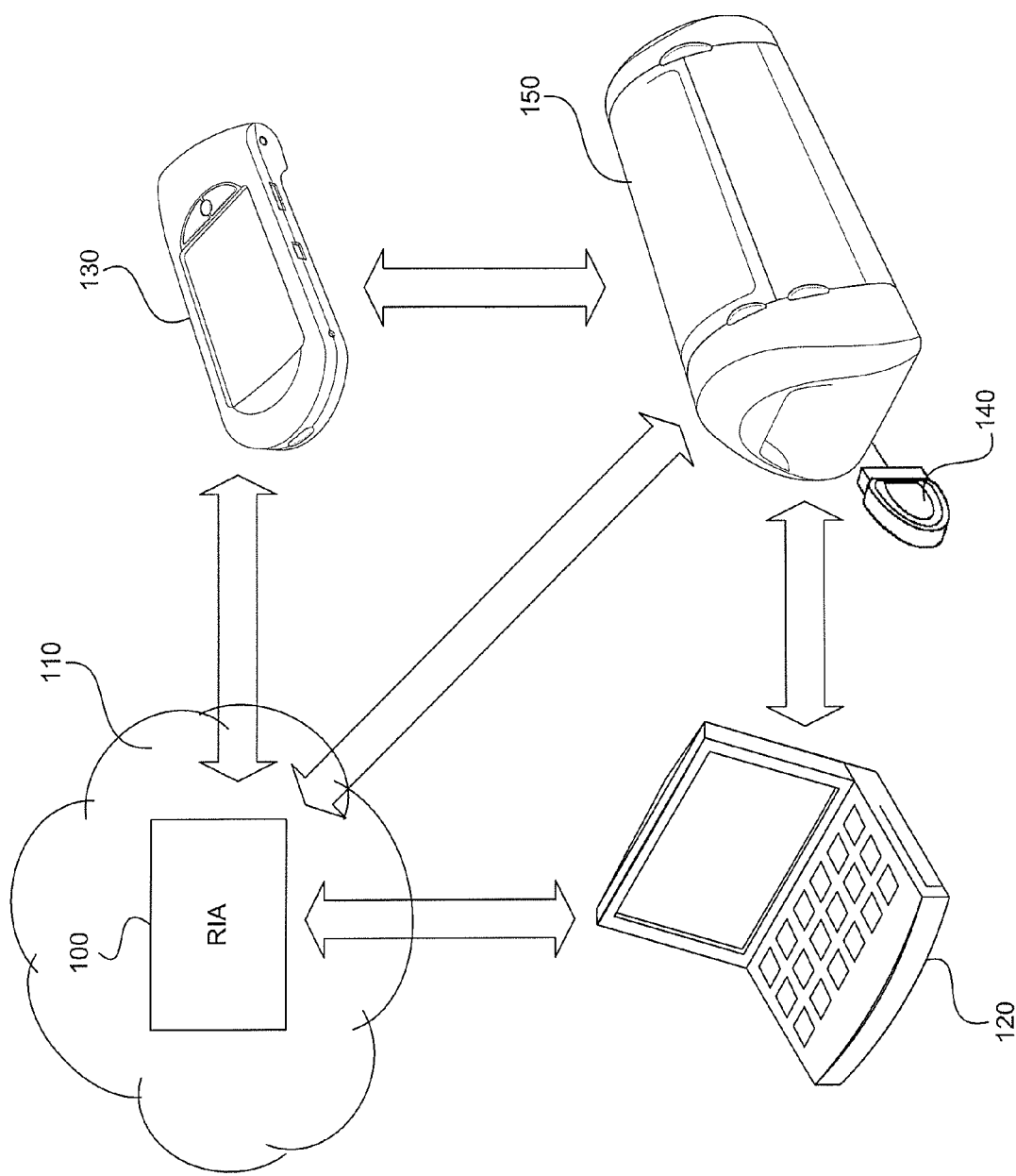
FIG. 1 is a schematic view of an electronic cutting system having design software interact with a computer, a hand-held controller, and/or an electronic cutting machine.
Figure 2:
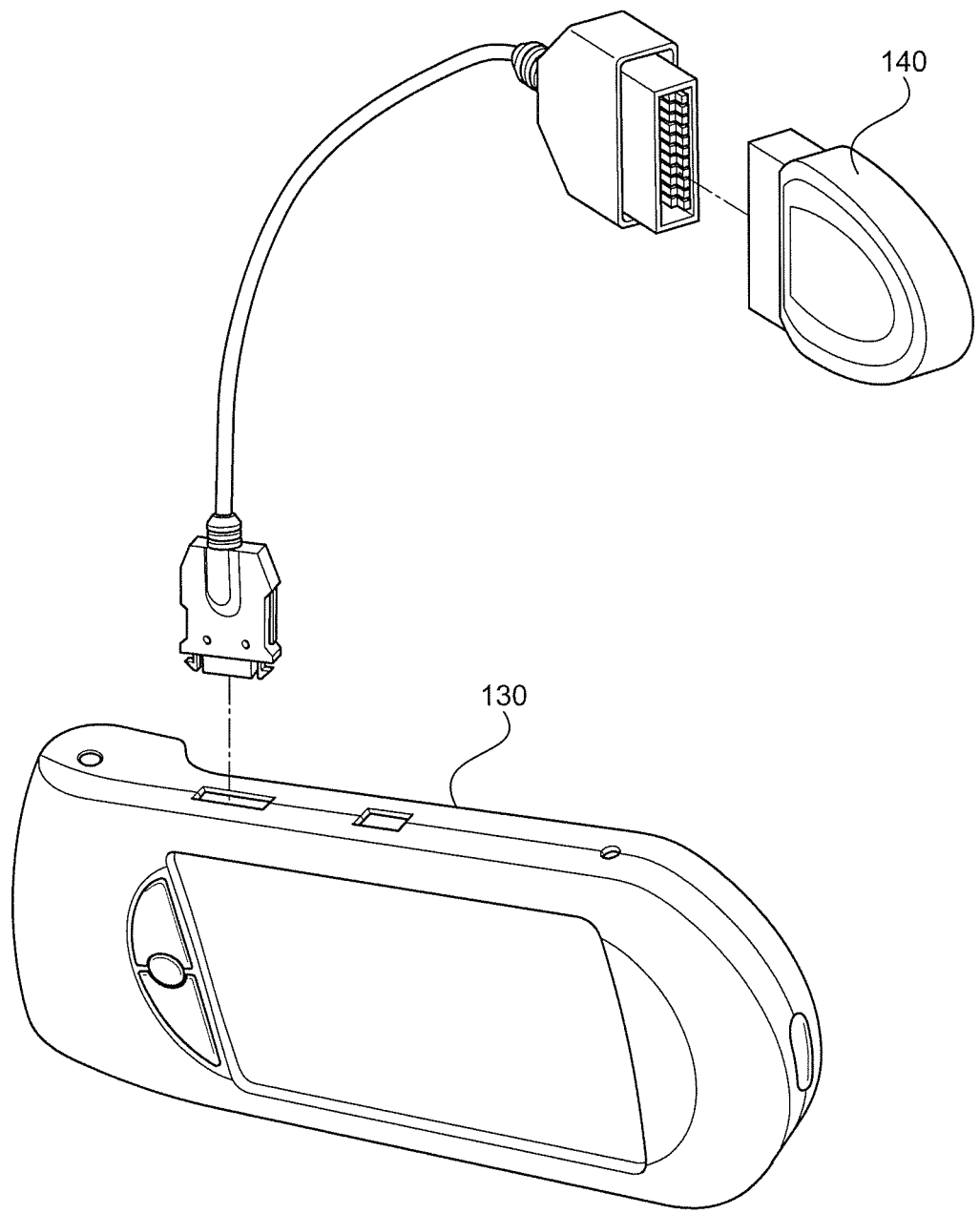
FIG. 2 is a perspective view of an exemplary hand-held controller establishing communication with an exemplary cartridge.

Referring to FIGS. 1 and 2, design software 100 may be used for creating and/or managing content as well as for interacting with an electronic cutting machine 150. The design software 100 may be stored in memory and executed on a processor of a computer 120, a hand-held controller 130, and/or the electronic cutting machine 150, each of which may provide a platform to store, use, and review digital content. In addition, the design software 100 may provide interaction with other design systems and/or community programs (e.g., uploading-publishing to blogs and other community websites, as well as downloading designs from the same). The design software 100 may interface with an electronic cutting machine 150 to realize designs by cutting out the constituent components of the designs, such as paper cutouts. Additionally, the digital content accessed in the design software 100 to create the designs can be compatible with the electronic cutting machine 150, and other devices, such as printers. In some implementations, the design software 100 provides access to digital content in a secure manner so as to allow for unfettered use by the owner while providing security against unauthorized duplication.

In some implementations, the design software 100 executes on a cloud client 110 of a cloud computing scheme. Cloud computing allows users to use applications without installation and provides access to their personal files at any computer or computing device with internet access. In general, cloud computing is virtualized third-party hosting, for example, where a user's server runs inside a virtual container which can be moved from one physical server to another without interruption of service. Such a container is also capable of spanning multiple physical machines, giving it potentially limitless resources. This allows for much more efficient computing by centralizing storage, memory, processing and bandwidth. In some implementations, the design software executes on a cloud client 110 that relies on cloud computing for application delivery, or is specifically designed for delivery of cloud services (e.g., content, design applications, etc.). The design software 100 may be a rich internet application (RIA) received through cloud computing. The design software 100 may provide design creation tools and capabilities. Moreover, the user may receive design applications and/or content on demand to the user's own computer 120 (e.g., laptop) or other computing devices, such as a hand held controller 130 of the electronic cutting machine 150, by accessing a subscription service. The digital content can be delivered by the cloud client 110 (e.g., a web server executing in a virtual container).

In some implementations, the user may access content (e.g., glyphs) for use with the design software 100 through a cartridge 140, which may be in communication with the electronic cutting machine 150, as shown in FIG. 1, or the hand held controller 130, as shown in FIG. 2. The cartridge 140 may store content in memory of the cartridge and/or content associated with the cartridge 140 may be stored on a cloud client 110 accessible by the design software 100. The user may access and design with content not otherwise owned by the user; however, when the user executes a cutting operation on the electronic cutting machine 100, the user may be required to verify ownership of any content used in a design to be cut. Ownership of content can be verified by establishing communication of any respective cartridges 140 with the design software 100 (e.g., via the hand held controller 130) and/or the electronic cutting machine 150. Moreover, the user may be prompted to purchase any content not owned by the user before allowing execution of the cutting operation on the electronic cutting machine 150.

The user may access the design software 100 as a rich internet application (RIA), create designs or projects using content provided by the design software, and save the designs or projects for later execution on an electronic cutting machine 150. The user may establish communication between the electronic cutting machine 150 and the design software 100 for executing cutting operations by wireless or electrical (e.g., Ethernet) connections to a computer 120 or other computing device 130 (e.g., hand-held device) running the design software 100 or to a network having internet connectivity for accessing the design software 100. While in communication with or executing the design software 100, the electronic cutting machine 150 may access information, such as machine type, cartridge type or content specific information from a cloud source (e.g., data storage in the cloud). Moreover, the design software 100 may access information from the electronic cutting machine 150 (such as make, model, owner information, stored content, etc.).

In some implementations, the design software 100 receives credit card information from the user to authenticate the user's log in. The design software 100 may require connection or communication with the controller device 130 of the electronic cutting machine 150 to authentication of the user. In some examples, the design software 100 tracks the browsing and usage of content for creating designs and delivers content (e.g., visually) to the user based on past usage of similar content (e.g., by category, keyword, etc.) and/or statistical analysis. Content may also be delivered to the user based on promotional activities or incentives.

Figure 3:
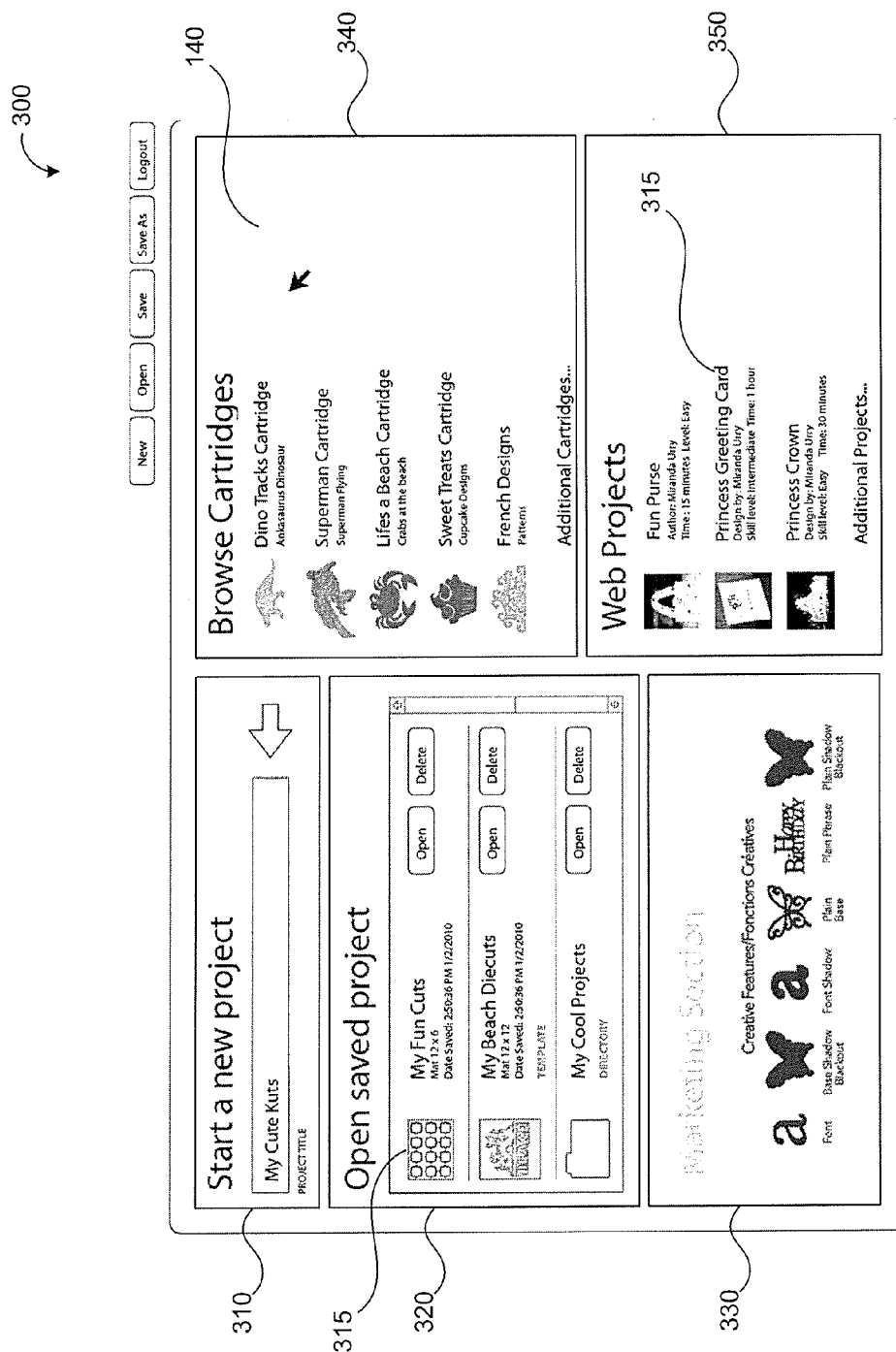
FIG. 3 is a schematic view of an exemplary navigation view of design software for creating and/or managing content as well as for interacting with an electronic cutting machine.

Referring to FIG. 3, in some implementations, the design software 100 includes a navigation view 300 that provides the user with access to projects and content. In the example shown, the navigation view 300 includes a new project portion 310, which allows the user to create and name a new design project 315 (also referred to as a job). The navigation view 300 may also include a saved projects portion 320, which allows the user to locate and access previously created projects 315. In the example shown, the saved projects portion 320 includes a list view of saved projects 315. The list view can provide a thumb nail image of the project 315, and project attributes, such as project name, mat size, date saved, tags, etc. associated with each project 315. The saved projects portion 320 may also allow the user to delete projects 315.

The navigation view 300 may have a display portion 330 that displays marketing, sales, and other information to the user. The information displayed in the display portion 330 may be user specific and based on the user's usage of the design software 100, such as content usage (e.g., statistical analysis of content usage). For example, a user that typically uses Superman related content may receive ads in the display portion 330 for new and/or un-owned Superman content.

In some examples, the navigation view 300 includes a cartridge portion 340 that allows the user to locate, browse, and/or access cartridges 140 (e.g., to view content). In the example shown, the cartridge portion 340 includes a list view of cartridges 140 accessible by the user.

The navigation view 300 may include a web projects portion 350. The web projects portion 350 may provide a list of projects 315 previously created by others. For example, the web projects portion 350 can provide a list of partially created projects 315 that allow the user to use a shell (e.g., template) and customize a portion of the content of a project 315 without having to create the entire project 315 from scratch. Moreover, the web projects portion 350 may provide a list of community projects 315 or multi-authored projects 315. The user may manipulate or add to the project 315 and repost the project 315 to the web projects portion 350 for access by others.

Figure 4:
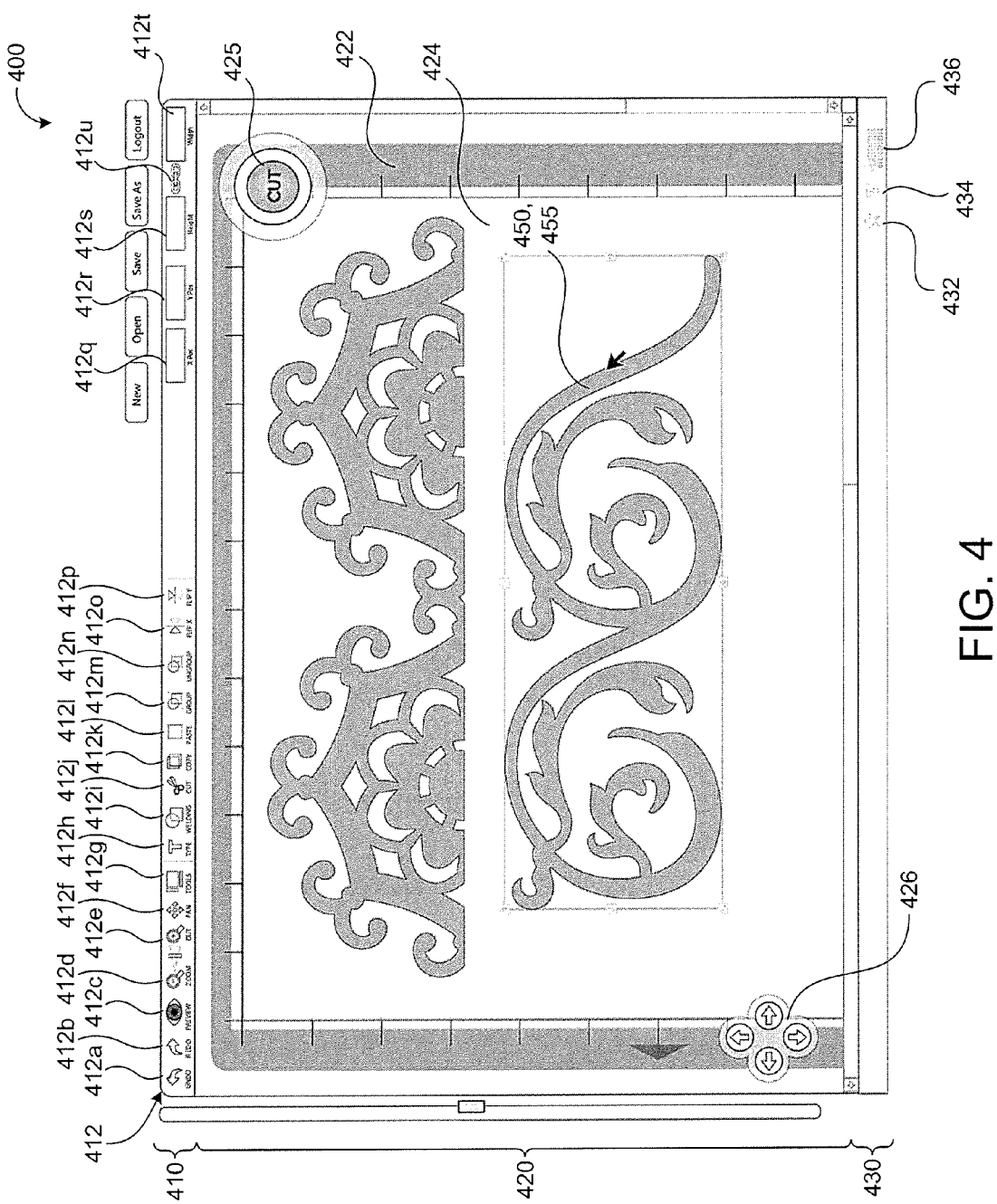
FIG. 4 is a schematic view of an exemplary design view of the design software.

Referring to FIG. 4, in some implementations, the design software 100 includes a design view 400 for creating and editing projects 315. In the example shown in FIG. 4, the design view 400 includes a toolbar 410, a virtual mat view 420, and a content portion 430 (e.g., navigation bar or view). The toolbar 410 includes one or more commands 412 for editing, manipulating, or otherwise interacting with a project 315. For one or more (or all) of the commands, the design software 100 may provide visual feedback of the executed command by indicating which command was selected and by showing a selected design object 450 change or alter as a result of the executed command. Moreover, the design software 100 may show on the virtual mat 422 how much available paper has be used or occupied as a result of the executed command.

As used herein, the term "design object" refers to something that is or can be selected by the user for manipulation, such as by executing a user initiated command. A design object 450 may be a glyph 455 or part of a glyph 455 (e.g., a subset of a glyph). For example, a command can be executed on a region of a multi region glyph 455. An exemplary single region glyph 455 is a circle, while an exemplary multi region glyph 455 is a figure-eight. A glyph 455 having multiple closed vector loops will have multiple regions defined by those vector loops. Each of these regions can be selected by the user. For example, when executing a copy command, the user first selects the glyph 455 and then a region of the glyph 455 that is to be copied.

A design object 450 may be a single glyph project as an entire project 315. For example, a project 315 may include data for orientation and size, but as long as only one glyph is in the job or project 315, then the project 315 may be considered single glyph. A design object 450 may be a multi-glyph project 315 as an entire project 315 (e.g., a project having multiple glyphs). In some examples, a design object 450 is a single glyph of a multi-glyph project 315. For example, the user can select a single glyph 455 from among multiple glyphs 455 in a project 315 and execute a command on the selected glyph 455. Moreover, in some examples, the user can select multiple glyphs 455 of a multi-glyph project 315 (e.g., a subset of a project 315) as a design object 450 and execute a command on the selected glyph 455. The design object 450 may be a single exploded layer 710 (FIG. 7), which can be a layer 710 that is no longer part of a composite image 1400 (FIG. 14). A composite image 1400 that has been exploded into multiple layers 710, may have each layer 710 treated as an individual glyph 455 or design object 450. In additional examples, the design object 450 can be a single layer 710 of a composite image 1400 (e.g., a paletted or non-exploded image).

Examples of toolbar commands 412 include undo 412a (e.g., undo x number of commands) and redo 412b (e.g., redo or re-execute n number of commands). The user may execute the undo command 412a to undo or cancel one or more previous actions or commands 412. The actions or commands 412 may be undone in reverse chronology.

The user may also redo or re-execute actions or commands that have been undone by executing the redo command 412b. In some examples, the toolbar 410 includes a clear all command (not shown) that clears the entire job (e.g., from memory and/or the virtual matt 422). The design software 100 may indicate that the clear all command has been selected or executed and may offer a confirmation screen to confirm the user's action to clear the entire job.

The toolbar 410 may include toolbar commands 412 for viewing the project 315 in different ways. Exemplary viewing commands 412 may include preview 412c (e.g., provide a view illustrating a cut project), zoom in 412d (e.g., zoom in on a portion of the virtual mat), zoom out 412e (e.g., zoom out on a portion of the virtual mat), and pan 412f (e.g., move a view in the virtual mat view 420 over other portions of the virtual mat 422). A tool options command 412g may be used to set or edit toolbar options. A type command 412h may be sued to create a text field for typing characters or strings. Moreover, a welding command 412i may be executed to join one or more edges of selected glyphs or design objects.

Additional examples of toolbar commands 412 may include cut 412j, copy 412k, paste 412l, palette 412m (e.g., paletting together multiple design objects as one composite design object), unpalette 412n (e.g., making a composite design object into multiple constituent design objects), flip X 412o (e.g., flip a selected design object about an x axis), flip Y 412p (e.g., flip a selected design object about a y axis), horizontal location 412q (e.g., set a relative or absolute x coordinate), vertical location 412r (e.g., set a relative or absolute y coordinate), height 412s (e.g., set a height of a selected design object), width 412t (e.g., set a width of a selected design object), and scale locking 412u (e.g., lock a height to width relationship). In some examples, the user may customize the toolbar 410 by adding, removing, and/or arranging commands 412 on the toolbar 410.

The virtual mat view 420 includes a virtual mat 422 and at least one virtual paper 424 (representing actual paper for cutting on the electronic cutting machine 150). The user may place design objects 450 (e.g., glyphs) on the virtual paper 424 for creating and/or editing a project 315. The virtual mat view 420 any include a cut command 425 for sending the project 315 to an electronic cutting machine 150 in communication with the design software for execution of a cutting operation. The virtual mat 420 may also include a panning command 426 (e.g., up, down, left, right arrows) for moving a view of the virtual mat 422 in the virtual mat view 420.

Referring to FIGS. 5-9, in some implementations, the design view 400 includes a command menu 440 (e.g., accordion menu) having one or more command palettes (e.g., tabs). One or more of the commands of the command menu 440 may be executable one or more design objects 450 in the design view 400. In the example shown in FIG. 5, the command menu 440 includes a fonts palette 500, a transform palette 600, a layers palette 700, a shadow palette 800, and an options palette 900. The fonts palette 500 includes font commands 510 for editing textual design objects 450 (e.g., glyphs of characters or strings). Examples of font commands 510 include font cartridge 510a (e.g., for locating, selecting, and accessing a cartridge 140), font style 510b (e.g., for selecting a font from the loaded cartridge 140), font size 510c (e.g., for setting the font size), kerning 510d (e.g., for setting a character spacing), slant X 510e (e.g., for setting a character slant with respect to an x axis), slant Y 510f (e.g., for setting a character slant with respect to an y axis), and weld gap 510g (e.g., for setting an glyph spacing for welded glyphs). In addition to using the command menu 440 to manipulate or edit design objects 450, the user may select a design object 450 and edit the size, rotation, and slant of the design object 450 by using a corresponding size handle 452, rotation handle 454, and a slant handle 456 of the design object 450.

Figure 6:
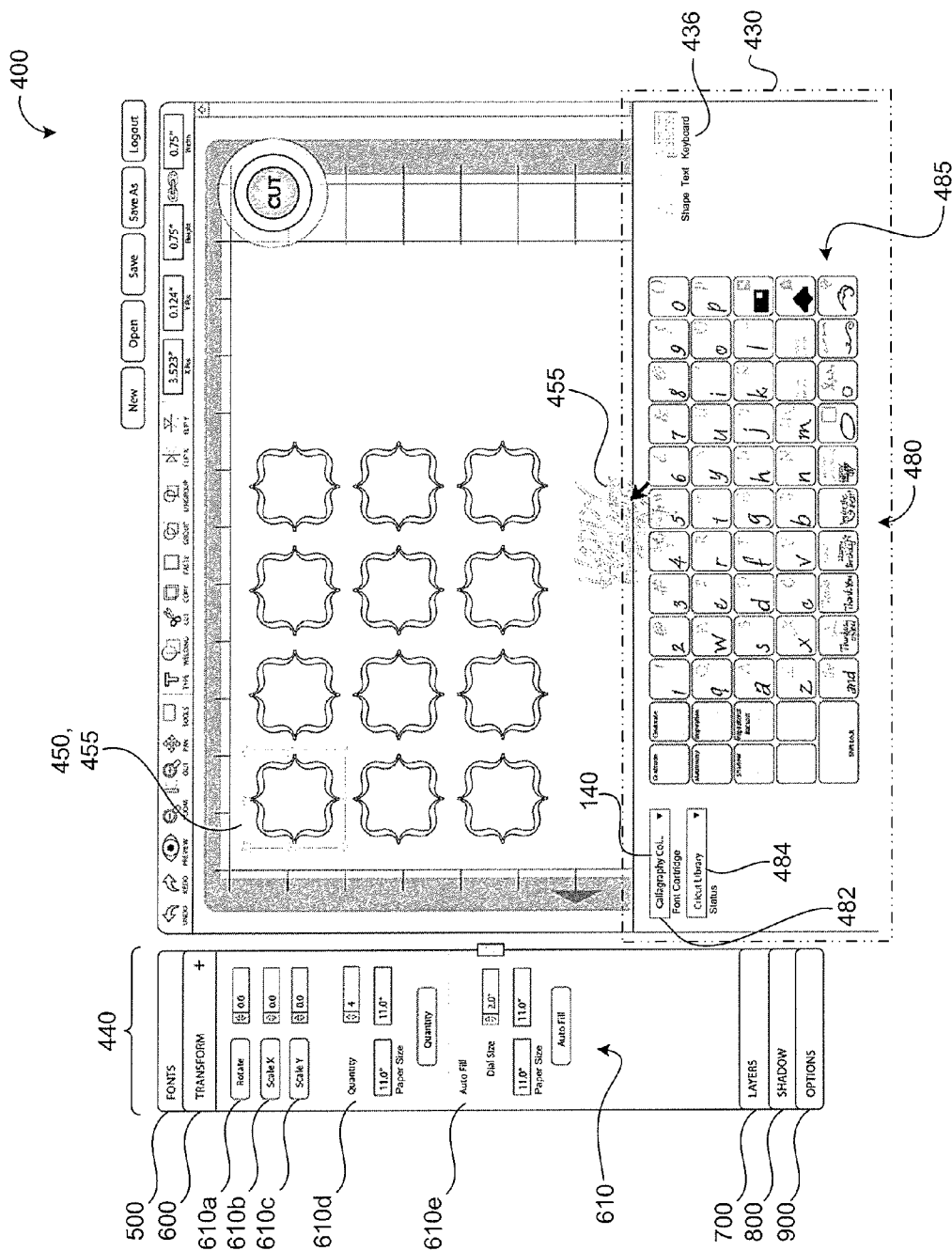
FIG. 6 is a schematic view of an exemplary command menu with a transform palette and an exemplary keyboard view for use with the design view of design software.

Referring to FIG. 6, in some implementations, the transform palette 600 includes transformation commands 610. A rotation command 610a for setting a rotation of a selected design object 450 with respect to an axis, such as an X axis. For example, the design software 100 may allow a user to select a design object 450 and set an orientation of the design object 450 (e.g., landscape or portrait, or change the orientation of the object by an angle, such as 0°, 45°, 90°, 180°, etc.). Moreover, the user may select design objects 450 (e.g., glyphs) and all respective nested attributes (i.e., patterns from a palette) and change their orientation. If a selected design object 450 has already been rotated, the rotation command 610a is added to the existing orientation of that design object 450. The design software 100 can provide visual feedback of the executed command by showing the design object 450 change orientation with respect to a previous orientation and/or by showing how much available paper 424 has be used or occupied as a result of the executed command. Other transformation commands 610 may include scale X 610b (e.g., to set a scaling factor along the X axis of the virtual mat 422 for sizing a selected design object 450), and scale Y 610c (e.g., to set a scaling factor along a Y axis of the virtual mat 422 for sizing a selected design object 450).

In some implementations, the design software 100 allows a user to select a design object 450 and execute a quantity command 610d. The design software 100 may repeat the selected design object 450 by the received quantity in a grid pattern (as shown) or some other pattern (predetermined, set by the user, or otherwise established). In some examples, the user may specify a paper size, so as to adjust the paper size to fit a desired quantity. For example, if the user selects a 3 inch glyph 455 (e.g., the four-pointed shape shown) as the design object 450 and executes the quantity command 610d with a quantity of 12, the design software duplicate or repeat the selected glyph 12 times. If the user had selected two glyphs 455 (e.g., as the design object 450) and executed the quantity command 610d with a quantity of 12, the design software would have repeated the two glyph pair 12 times. If the quantity command 610d requires more than one sheet of paper 424 to cut the received quantity, the user may be informed of the number of pages 424 needed to complete the entire quantity. The user may also select a different paper size to accommodate the quantity command 610d. If the user selects a paper size too large for the virtual mat 422, the user may receive an error message or be limited to a maximum paper size corresponding to a mat size of the virtual mat 422. The design software 100 may provide visual feedback to the user by indicating that the quantity command 610d is on or has been select, by showing the quantity entered by the user, by showing how much available paper 424 has been used by the repeated design object(s) 450, and/or by showing how many pages 424 it will take to fill the quantity.

In some implementations, the design software 100 allows a user to select a design object 450 and execute an auto-fill command 610e, which duplicates the selected design object 450 in a grid pattern to fill the page 424. The auto-fill command 610e can be similar to the quantity command 610d, except rather than repeating the selected design object(s) 450 by a specified quantity, the auto-fill command fills the entire page 424 with as many design objects 450 that will fit. For example, if the user selects one or more design objects 450 and executes the auto-fill command 610e, the design software 100 duplicates or repeats the selected design objects 450 as many times as possible to fit on the paper 424 (e.g., without having partial design objects 450 on the edge of the paper 424). The user may also select a different paper size to accommodate more design objects 450. Visually, the design software 100 can indicate that the auto-fill command 610e has been selected (e.g., in the transform palette 600) and/or by showing the number of times that the design object(s) can be repeated (e.g., on the virtual mat 422 in the mat view 420 and/or by indicating a repetition number). The design software 100 can also show how much of the paper 424 is occupied by the repeated design object(s) 450.

Figure 7:
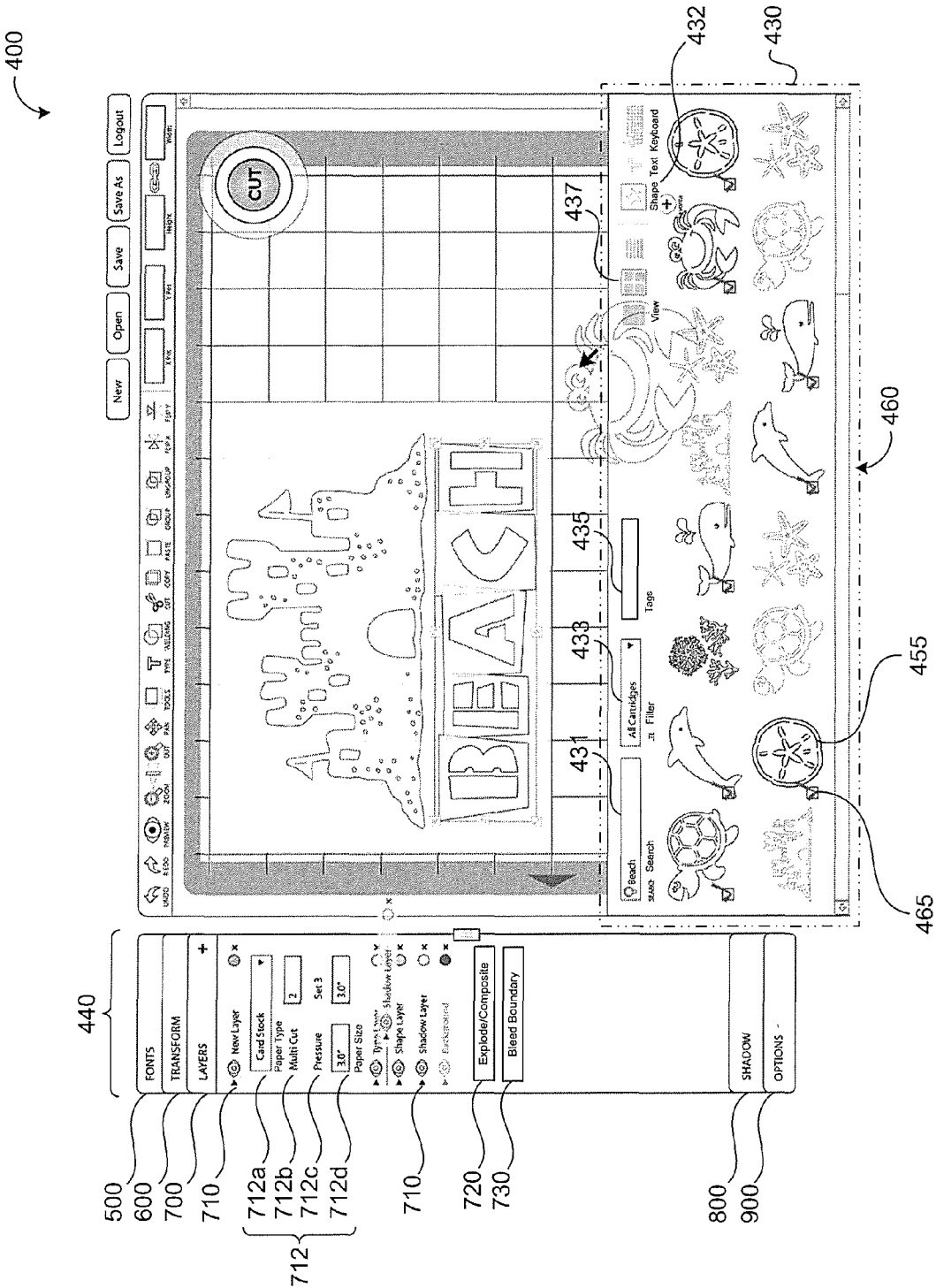
FIG. 7 is a schematic view of an exemplary command menu with a layers palette and an exemplary shapes view for use with the design view of design software.

Referring to FIG. 7, in some implementations, the layers palette 700 allows the user to create and manage layers 710 of a project 315 and/or a design object 450. The project 315 may include one or more layers 710 for managing and/or organizing the creation of the project 315. For example, the user may create layers 710 and change an order of the layers 710 (e.g., from front to back). In some implementations, the user may specify one or more parameters or commands 712 of a layer 710, when creating the layer 710. For example, the user may select a paper type 712a, set a multi-cut command 712b, a pressure command 712c, and/or a paper size 712d.

The multi-cut command 712b may allow the user to set a number of cut passes performed by the electronic cutting machine 150 for a selected design object 450, layer 710 or the entire project 315. When a cut operation is performed, the electronic cutting machine 150 cuts and then re-cuts the design object 450, the layer 710, or the entire project 315 receiving the multi-cut command 712b until the number of cuts has been satisfied. In the case of a project 315 that includes multiple glyphs 455, each glyph 455 may be cut the number of times designated by the user before moving to the next glyph 455 in the project 315. Moreover, if the quantity command 610d is on or has been executed, and the project 315 will take more than one page 424 to cut, the electronic cutting machine 150 may complete a whole page 424 of multi-cuts before moving on to an additional page 424. The design software 100 may indicate that the multi-cut command 712b has been selected and/or how many cuts will be performed. The cut pressure command 712c may allow the user to set a downward pressure applied to a blade housing of the electronic cutting machine 150 during cutting. The entire project 315 or a specific layer 710 can be cut at the cut pressure entered by the user.

The design software 100 may provide an exploded/composite command 720 that allows a user to toggle between cutting a project 315 in an exploded view of layers 710 or a composite view of layers 710. For example, when the user selects the exploded/composite command 720 and a selected design object 450 is in a composite state, the design software 100 moves all layers 710 of the design object 450 on the virtual mat 422 so as to not overlap in any way. This results in each layer 710 being cut separate from one another. All of the layers 710 can be nested tightly together to conserve paper 424. If the design object 450 is in an exploded state when the user selects the exploded/composite command, the design software 100 moves all layers of the design object 450 to their respective home (e.g., un-exploded) positions on the virtual mat 422. This allows the design object 450 to be cut as a composite (e.g., with overlapping layers 710).

The design software 100 may visually show movement of the layers 710 of the design object 450 and/or the composite or exploded states. Moreover, the design software 100 may visually show how much of the available paper 424 has been used by the executed command. In some examples, the user can toggle a layer 710 to be viewed on the virtual mat 422 in a color or design format or a cut-path format, which only shows the cut paths of the glyphs 455 on that layer 710.

Figure 8:
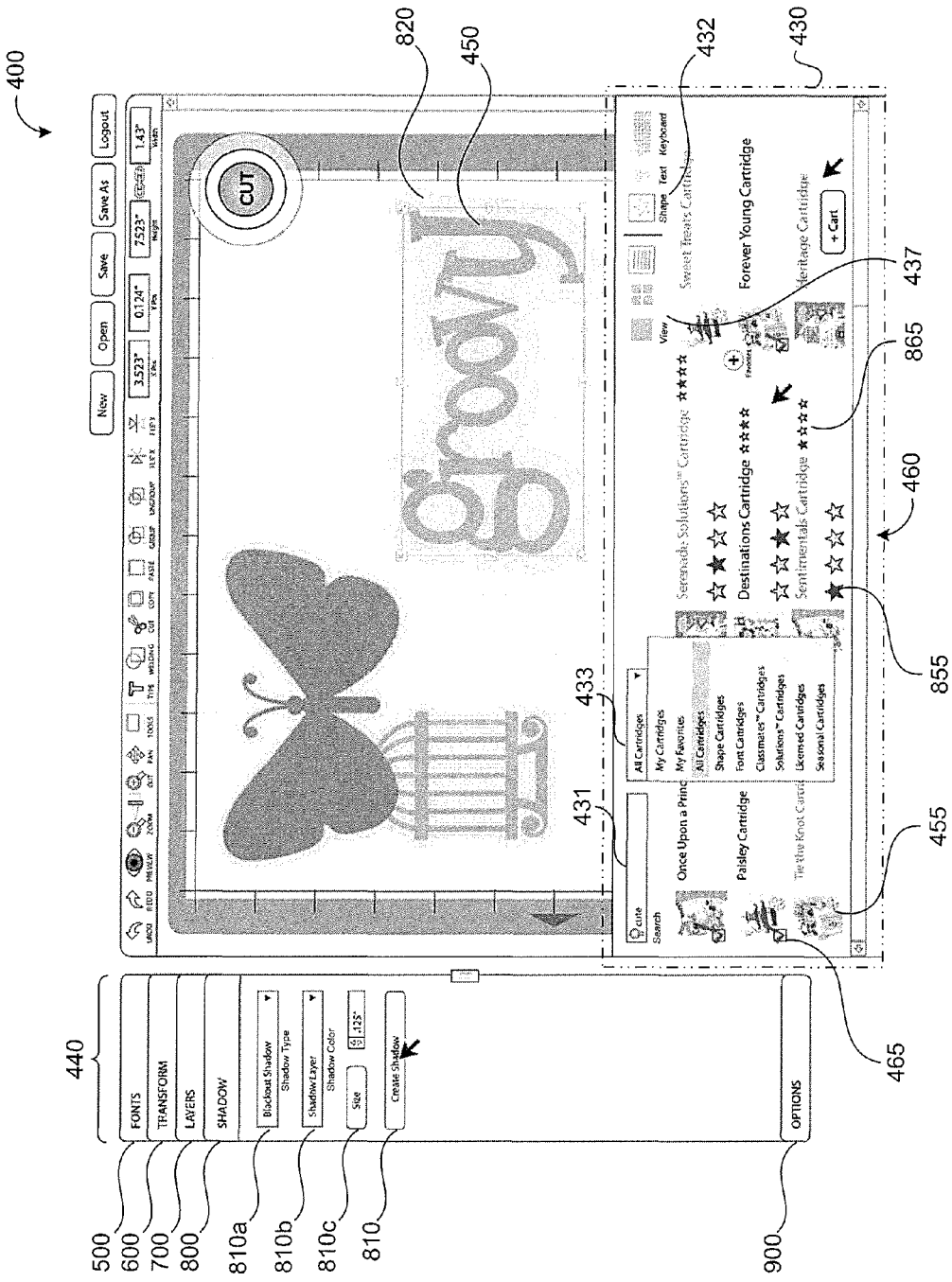
FIG. 8 is a schematic view of an exemplary command menu with a shadow palette and an exemplary shapes view for use with the design view of design software.

Referring to FIG. 8, the shadow palette 800 may include a shadow command 810 for creating a shadow 820 on a design object 450. The shadow command 810 can have user defined parameters such as a shadow type 810a, a shadow color 810b, and/or a shadow size 810c (e.g., width of shadow 820). The shadow 820 may be a design object 450, such as a layer 710 nested or paletteed with the design object 450 that was shadowed.

Figure 9:
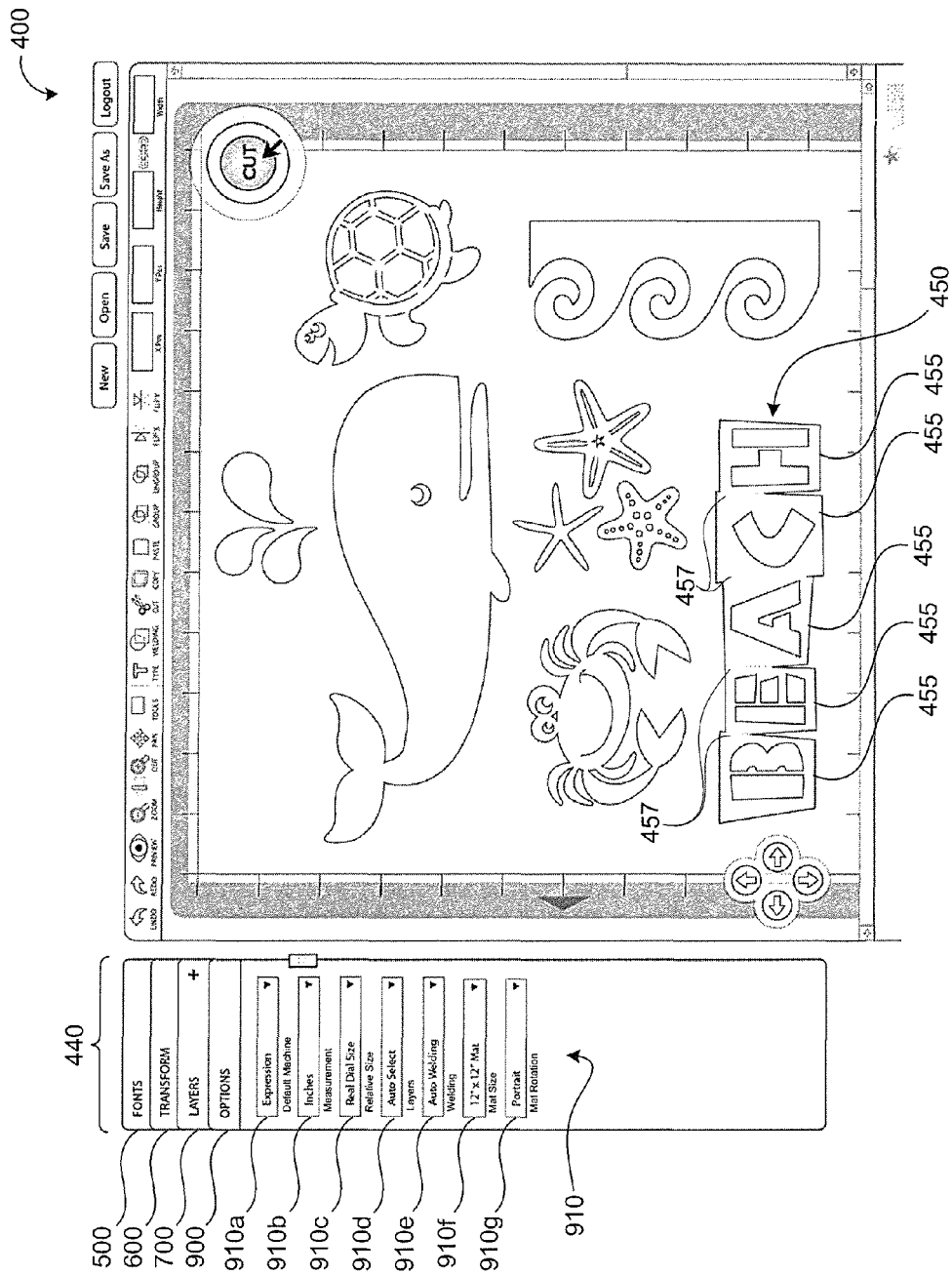
FIG. 9 is a schematic view of an exemplary command menu with an options palette for use with the design view of design software.

Referring to FIG. 9, the options palette 900 may include option commands 910, such as default machine 910a for setting the default connected electronic cutting machine 150, measurement 910b for setting units of measure (e.g., mm, cm, inches, etc.), and relative size 910c for setting the size of a design object 450 to be based on actual size or relative size. For example, a user may wish to create a design object 450 using true size (e.g., the actual size that will be cut) or relative size (e.g., the size of one design object 450 relative to another or to some reference). With relative size, the design object 450 is sized relative to another design object 450. For example, in typing a string "H-A-T" (e.g., by selecting the type command 412h in the toolbar 410), the user may use the relative size command 910c to set the size of the "A" and "T" to be half the size of the "H", such that when the "H" is resized, the "A" and "T" are automatically resized to be half that of the "H".

The design software 100 may provide a command that allows the user to toggle between true size and relative size for a selected design object 450 or an entire project 315. For example, with true size selected, every design object 450 in the project 315 may be cut using the true or actual size of each glyph 455 (e.g., the height from the top of the glyph 450 to the bottom of the glyph 450), while with relative size selected, every design object 450 in the project 315 may be cut using a reference size (e.g., a reference height) for each glyph 455 with respect to a reference, such as a design object 450. The design software 100 may indicate that either true or relative size is turned on and/or how much of the available paper 424 has been used by the design object(s) 450.

Other options commands 910 may include a layers selection command 910d for setting auto-selection of layers 710, a welding selection command 910e for setting manual or auto-welding, a mat size command 910f for setting a mat size of the virtual mat 422, and a mat rotation 910g for setting a mat orientation (e.g., portrait or landscape).

Figure 5:
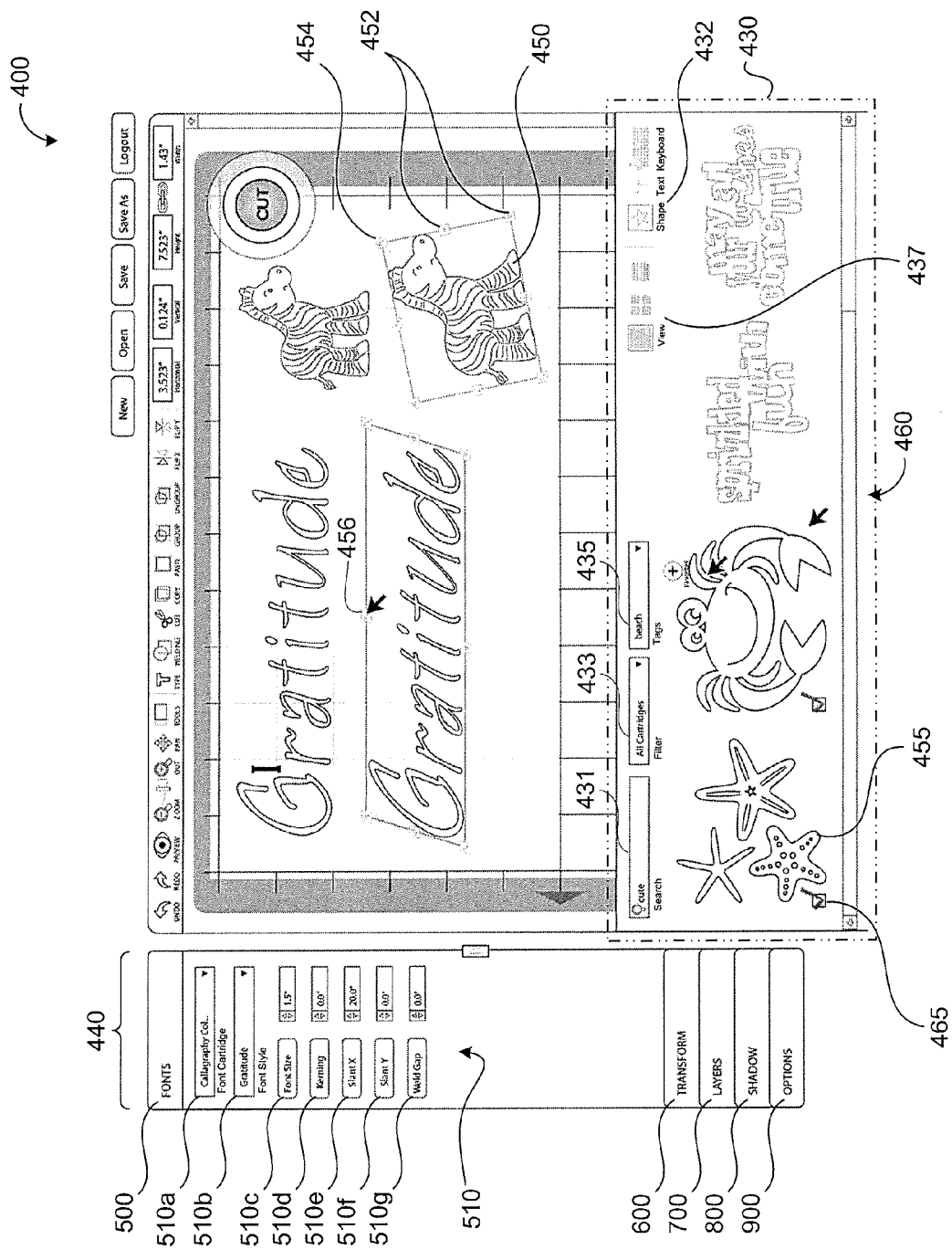
FIG. 5 is a schematic view of an exemplary command menu with a fonts palette and an exemplary shapes view for use with the design view of design software.

Referring to FIGS. 5 and 9, in some implementations, welding is the process of connecting the outside perimeters of two or more images or glyphs 930 to form a new image or glyph 930. The weld gap command 510g (FIG. 5) may be used to set an overlap distance of the images or glyphs 930. FIG. 9 provides an example design object 450 containing the word "BEACH". Each letter of the word can be a glyph 455 positioned with respect to each other. If the user wishes to have each letter overlap, yet still be cut individually (e.g., have the electronic cutting machine 150 cut each letter entirely and separately), the user may set the kerning command 510d (FIG. 5) to adjust an image spacing (e.g., character spacing of the word). Negative kerning allows the user to overlap glyphs 455, while not welding the glyphs 455 (e.g., merging the glyphs 455 together in appearance). Kerning may be based on a distance between font edges.

Welding may be based on a distance between visual image edges. If the user wishes to weld the glyphs 455 together, the user may select the glyphs 455 and the welding command 410i from the toolbar 410 or have auto-welding selected in the welding selection command 910e. The auto-welding command can automatically weld overlapping glyphs 455 together (e.g., of the same or different design objects 450). The user may use the weld gap command 510e to adjust a spacing or overlap distance of adjacent glyphs 455. When glyphs 455 are moved into positions having at least one overlapping region 457, the welding command 410i can be executed. For welding, the overlapping region 457 is not desired to be cut, because it would create separate pieces, rather than a single piece (the resultant of the welding operation). Thus, the user may arrange the glyphs 455 to choose how to weld or merge the glyphs 930 together. The welded or merged glyphs 455 are replaced by a single resultant glyph 455 having a single cut path thereabout. The cutting path removes the overlapping area(s) 457 that would have created an awkward extra piece(s) if no welding or merging was performed.

To determine the overlapping area 457 and merge the outer cutting paths of the overlapping glyphs 455, the design software 100 may determine the outer cutting path for each glyph 455, and then determine the overlapping area 457. Where the cutting path around one glyph 455 intersects the cutting path around another glyph 455, the two cutting paths are merged at those points and the inner cutting path(s) is(are) not taken. In the example shown, there glyphs 455 corresponding to the letters of the word BEACH each have two cutting path intersections between adjacent letter glyphs 455. The common or overlapping area(s) 457 of the glyphs 455, which are not cut, are bounded by the overlapping area 457. The cut paths for the welded glyphs 455 may be reviewed and identified as either a boundary or webbing. If the cut path is considered "webbing" (e.g., cut paths that are internal to the design) then they are ignored and not cut. If the cut paths are boundary cut paths and do not intersect another boundary, then they are cut as they would normally be cut. If the cut paths are boundary cut paths and do intersect another boundary, then the two lines are joined so that the overlapping regions 457 defined by the two boundaries are made into one region.

Referring to FIGS. 4-8 and 10, the content portion 430 may include controls or commands for accessing content (e.g., from cartridges 140). In the examples shown, the content portion 430 includes a shapes link 432 to view a shapes view 460, a text link 434 to view a text view 470, and keyboard link 436 to view a keyboard view 480. The content portion 430 may include search tools for finding content on cartridges 140. The user may enter a search string in a search field 431 to search cartridges 140 for relevant content. The search may be a key word search on cartridge names, tags, and/or other fields. The user may use the filter 433 to focus the search results, for example, on all cartridges 140 available or a sub-set of cartridges 140 (e.g., by cartridge type or those owned by the user). The user may also search by tags in the tag field 435. The search results can be viewed in different formats by selecting a view type 437 (e.g., large glyph (FIG. 5), small glyph (FIG. 7), or detail view (FIG. 8)). Each glyph 455 may have an ownership identifier 465 (e.g., indicating the user or some other user owns the content). The user can select one or more glyph(s) 455 form the shapes view 460 and drag-n-drop the glyph(s) 455 onto the virtual mat 422 for arrangement on the paper 424.

Referring to FIG. 6, the keyboard view 480 provides with user with a keyboard style layout of glyphs 455, which the user may select and add to a project 315. The user may access cartridge content from a cartridge selector 482. Upon selecting a cartridge 140, a corresponding keyboard overlay 485 of the cartridge content is displayed in the content portion 430. A status selector 484 allows the user to select a cartridge library.

Figure 10:
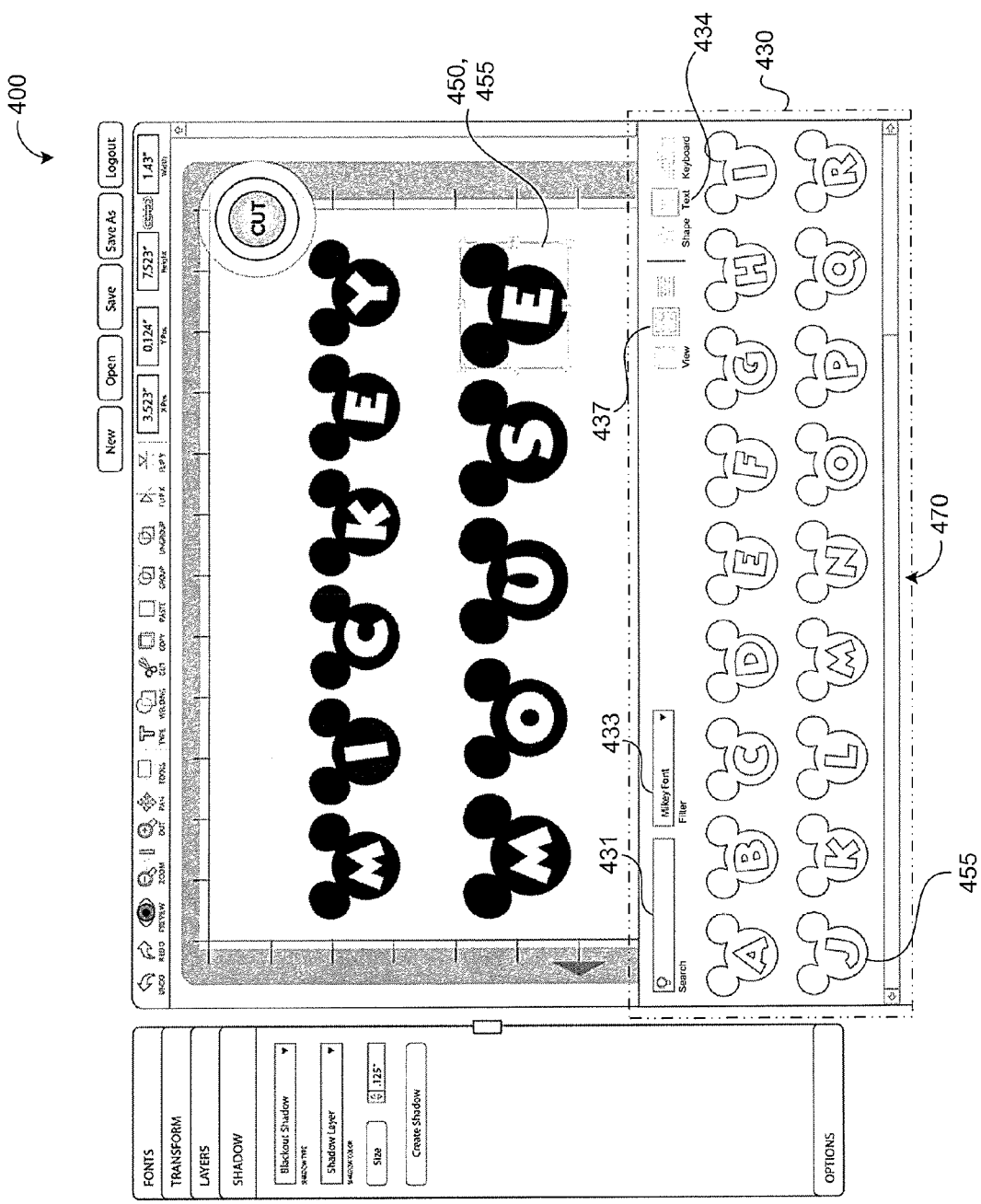
FIG. 10 is a schematic view of an exemplary text view for use with the design view of design software.

Referring to FIG. 10, the text view 470 allows the user to view textual glyphs 455 for use in a project 315. The user can select one or more glyphs 455 from the text view 470 and arrange them on the virtual mat 422. In some examples, the search tools only return font type cartridges.

Figure 11:
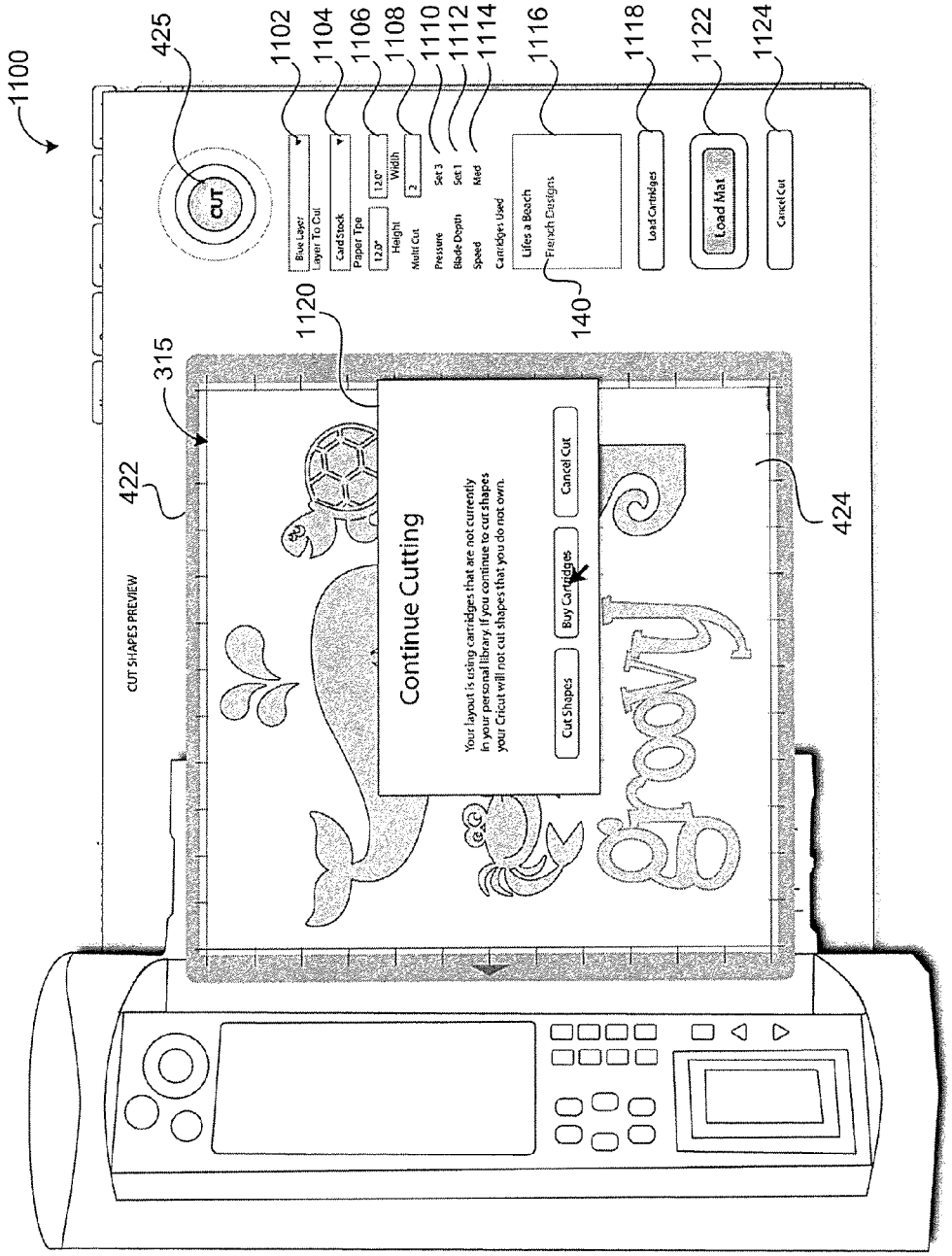
FIG. 11 is a schematic view of an exemplary preview view of design software.

Referring to FIG. 11, when the user decides to cut a project 315 on an electronic cutting machine 150, the user can execute the preview command 412c (FIG. 4) or the cut command 425 to preview the cut project 315 in a preview view 1100 and select cutting options. The user may select one or more layer 710 to be cut in a layer-to-cut selector 1102 as well as a paper type 1104 (e.g., card stock, paper weight, etc.) and a paper size 1106. The user can select and assign values for multi-cut 1108 (e.g., causing repetitive passes about cut paths by a given number), blade pressure 1110, blade depth 1112 (e.g., a penetration depth of the blade of the electronic cutting machine 150 into the paper), and/or blade speed 1114 (e.g., the cutting speed or speed of blade movement over the paper). The preview view 1100 can also provide a cartridges used view 1116, which lists all of the cartridges 140 associated with content (e.g., glyphs 455) used in the project 315. Any cartridges 140 not owned by the user can be identified (e.g., by a different color, check mark, etc.). The user can select load cartridges 1118 to load or purchase cartridges 140 not previously recognized as being owned by the user. For example, the user may establish communication of one or more cartridges 140 to the design software 100 (e.g., via the computer 120, the hand held controller 130, or the electronic cutting machine 150) for verification of ownership of the content associated with the connected cartridge(s) 140. Moreover, the design software 100 may prompt the user with a window of dialog box 1120 which allows the user to choose between purchasing any un-owned cartridges associated with content in the project 315, cutting the project 315 without any un-owned content (e.g., omitting any glyphs from the design that are associated with un-owned cartridges 140), or canceling the cut operation. The preview view 1100 may include a load mat command 1122 for loading a mat into the electronic cutting machine 150. For example, the user can hold the mat up to an entrance of the electronic cutting machine 150, select load mat 1122, and the electronic cutting machine 150 grabs and loads the mat thereon. The preview view 1100 may also include a cancel command 1124 for canceling the cut operation and returning to the design view 400 or exiting the design software 100.

Figure 12:
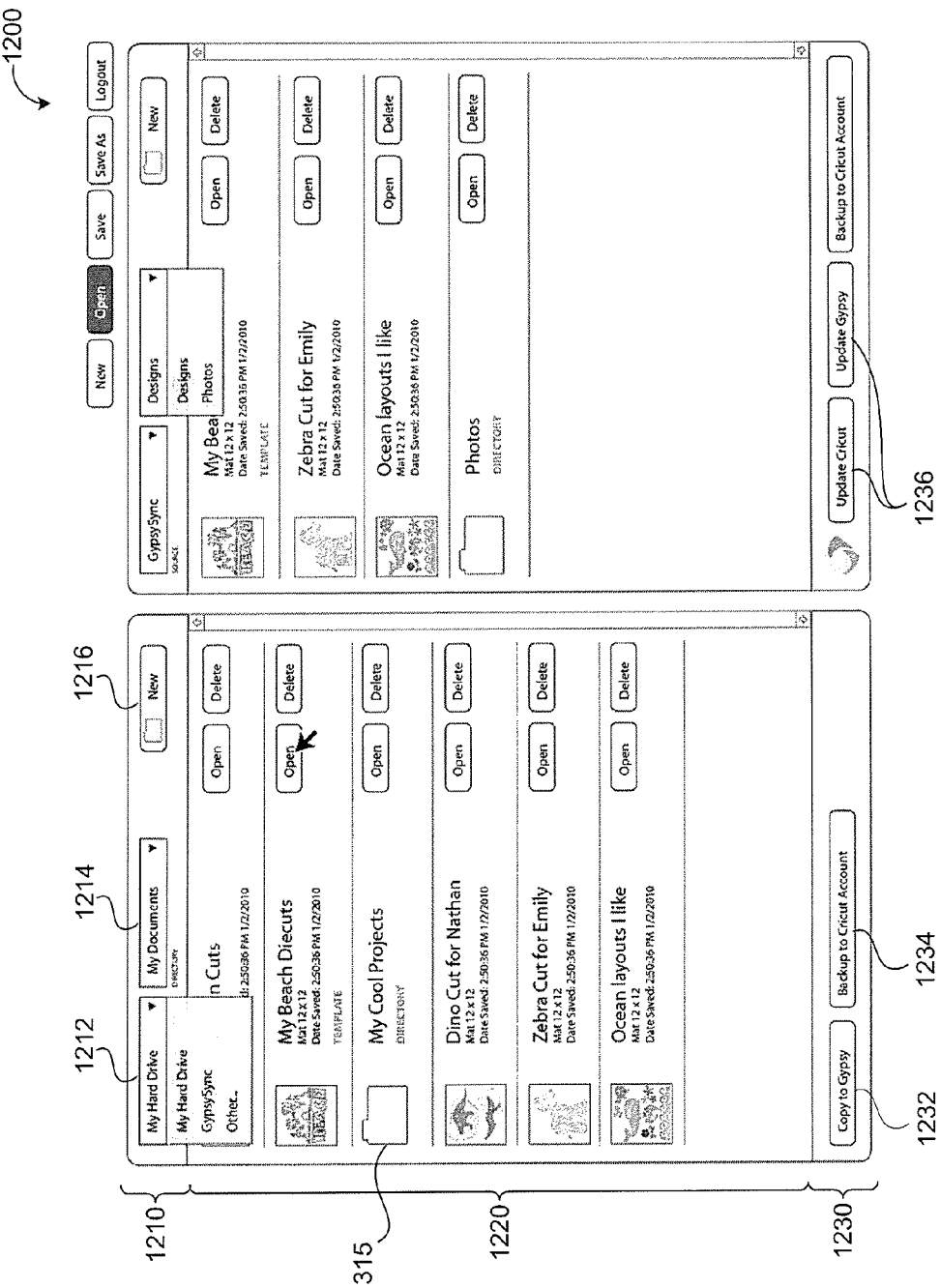
FIG. 12 is a schematic view of an exemplary project management view of design software.

Referring to FIG. 12, in some implementations, the design software 100 includes a project management view 1200 for managing projects 315, and may be accessible by selecting "open". In the example shown, the project management view 1200 includes a project search portion 1210 and project listing portion 1220. The project search portion 1210 may include a source selector 1212 (e.g., for selecting a memory source, such as a hard drive, external drive, etc.) and a directory selector 1214 for selecting a file directory (e.g., by navigating a folder tree). The project search portion 1210 may also include a new command 1216 for creating a new project 315. The project listing portion 1220 provides a listing (e.g., list view) of projects 315 found by search executed in the project search portion 1210. Each project 315 may include information or attributes such as name, mat size, date saved, author, file location, cartridges used, project type (e.g., template, normal, etc.), tags and others. In some implementations, the user may edit the project attributes by selecting the project 315 and the attribute for editing. In some examples, the user can edit a share tag or attribute to denote the project as sharable on a community network, database, forum, etc. Moreover, the user may add tags to the project 315 that describe the project for easier key word searching of the project 315. Each project 315 may include a list of cartridges 140 used in the project 315. The user may be able to view which cartridges 140 of the selected project 315 are owned by the user as well as search for other projects 315 that use cartridges 140 owned by the user.

The project management view 1200 may also include a storage portion 1230 that allows the user to copy 1232 a selected project 315 to the hand held controller 130 or the electronic cutting machine 150, backup 1234 the selected project 315 to an online account, and/or update 1236 the hand held controller 130 or electronic cutting machine 150 with project or cartridge information.

In some implementations, some projects 315 may have a type "template". The user can select the template type project 315 from the project selection portion 1210 for usage in the design view 400. In some examples, the template type project 315 includes an arrangement of glyphs 455 and/or instructions for completion of the project 315. Moreover, the template type project 315 may have guide glyphs 455 (e.g., silhouettes) for guiding the user's placement of glyphs 455 to create a particular pattern or design. The guide glyphs 455 may be for the design view 400 only and thus not cuttable or viewable in the preview view 1100.

Figure 13:
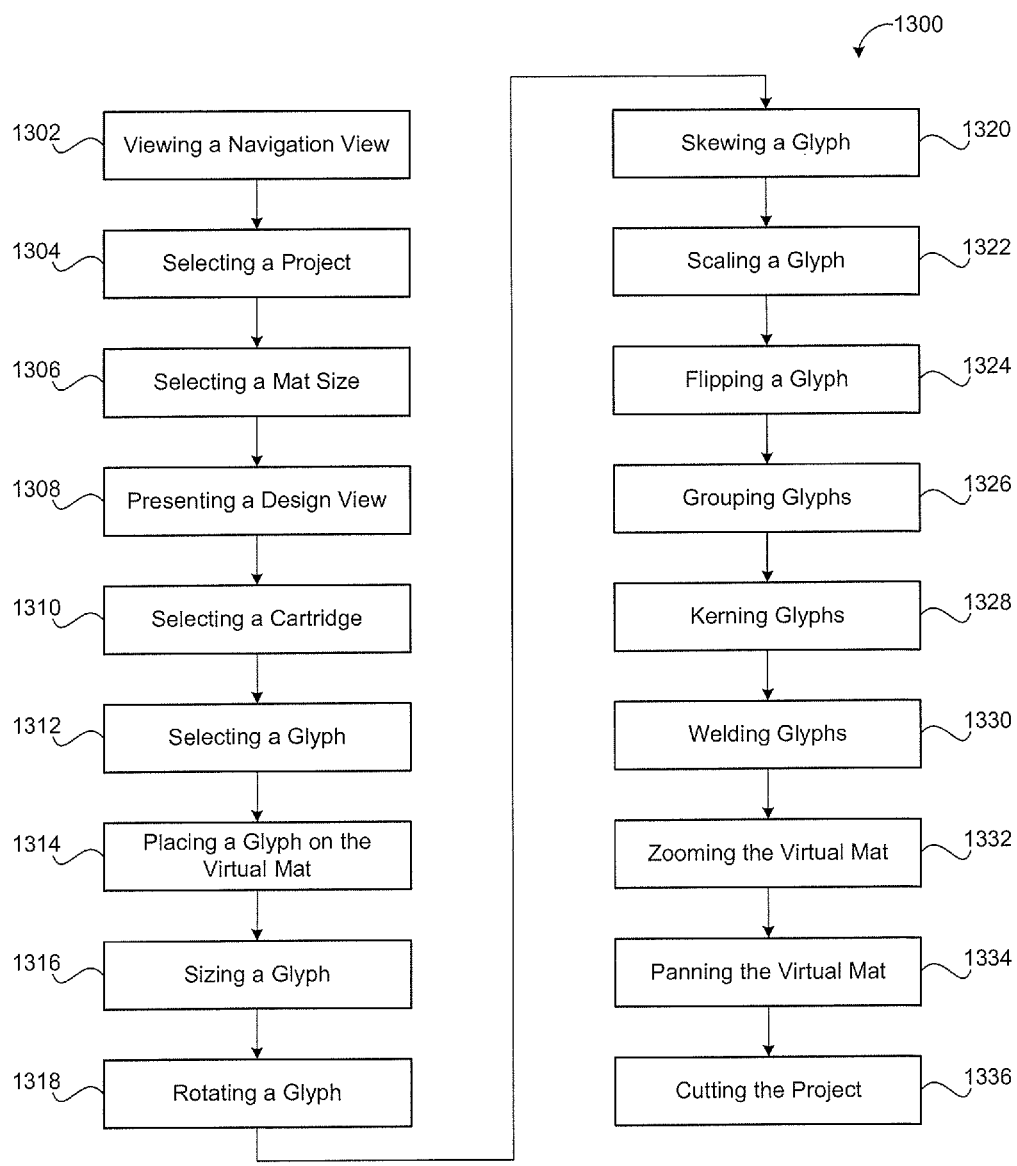
FIG. 13 provides a schematic view of an exemplary arrangement of operations for using design software.

FIG. 13 provides a schematic view of an exemplary arrangement of operations for using the design software 100. A user of the design software 100 may use one or more of the operations shown in various combinations and orders. In some implementations, the operations for using the design software 100 include viewing 1302 a navigation view 300 for access to projects 315 and content (e.g., cartridge content) and selecting 1304 a project 315. The user may select a new project 315 for creation in the new project portion 310 (FIG. 3) or an existing project 315 from the saved projects portion 320. In this example, the user selects a new project 315.

The operations include selecting 1306 a mat size, e.g., 6×12 or 12×12, and presenting 1308 a design view 400 having a virtual mat 422 shown. The operations further include selecting 1310 a particular cartridge 140 to add content to the virtual mat 422. The cartridge 140 may be considered a collection of glyphs 455 (e.g., an image representing the cutout from the digital content) for use. The user may be presented with a list of all available cartridges 140 (i.e., entire cartridge library) or only the cartridges 140 the user owns for selection. The design software 100 may allow the user to preview and even design with the entire cartridge library regardless of whether the user owns the cartridges 140 or not. In this way, the user may sample cartridges 140 before buying them. However, to cut a glyph 455 using the design software 100, the user may be required to prove ownership of that glyph 455, as by establishing communications between the cartridge 140 containing the desired glyph 455 and the design software 100 (e.g., via the hand-held controller 130 or the electronic cutting machine 150) to register the cartridge 140 and its content with the design software.

The operations for using the design software may also include selecting 1312 a glyph 455 and placing 1314 the glyph 455 on the virtual mat 422 (e.g., by drag-n-drop, selection alone, or some other suitable way of instantiating the selected glyph 455 on the virtual mat 455). The user may select a glyph 455 from the shapes view 460, the text view 470, or the keyboard view 480. In the keyboard view 480, the user may have the option of selecting "option" and "shift" buttons to change between multiple keyboard overlays. Additionally, the user may hover over each glyph 455 to view an enlarged or zoomed view of the glyph 455 to see it in more detail. The user may double-tap an image to select it and place it on the virtual mat 455 to begin designing with it.

In the design view 400, the virtual mat 422 allows the user to manipulate each glyph 455. For example, the user may move the glyph 455 around, align glyphs 455 with each other, show highlighted axes on the virtual mat 422 to allow for alignment, etc. The user may simply tap the glyph 455 and drag it to a new location on the virtual mat 422. There are also more precise positioning methods discussed herein that allow for direct entry of X/Y coordinates for positioning the glyph 455 to a precise location.

The operations may include sizing 1316 a glyph 455. In some examples, the user sets the height and width of the glyph 455 using the direct input methods of the respective height and width commands 412s, 412t in the toolbar 410 (e.g., entering height and width values into respective input fields). In additional examples, the user manipulates one or more size handles 452 of the glyph 455 to alter its size (e.g., stretching the glyph 455).

Other operations may include rotating 1318 (e.g., using the rotate command 610a), skewing 1320 (e.g., using the slant X 510e and/or the slant Y 510f commands), scaling 1322 (e.g., using the scale X 610b and/or the scale Y 610c commands), and/or flipping 1324 (e.g., using the flip X 412o and/or the flip Y 412p commands) the glyph 455. Other operations are possible as well for manipulating the look or placement of the glyph 455.

In some implementations, the operations include grouping 1326 two or more glyphs 455. For example, the glyphs 455 may be positioned on the virtual mat 422 in a desired orientation with respect to each other. The glyphs 455 may then be grouped together so that they may be moved, resized, rotated or otherwise manipulated together as if they were a single glyph 455. In some implementations, to select a group, the user selects each glyph 455 for grouping and then selects the group command 412m. With the selected glyphs 455 grouped together, the glyphs 455 can be moved together without having to be concerned about their relative positioning. Moreover, when precision is desired, the user may not be able to see the entire mat view when zoomed into a particular location for alignment, and the group function allows any number of glyphs 455 to be positioned at the same time. Once grouped, the user may also ungroup the grouped glyphs 455 for individual manipulation by selecting the grouped glyphs 455 and selecting the ungroup command 412n.

Other operations may include kerning 1328 glyphs 455 (e.g., via the kerning command 510d), for example, so as to remove a portion of space between adjacent glyphs 455 in preparation for printing or cutting. Kerning allows for the determination of a gap or distance between glyphs 455 and may be used to position two glyphs 455 relative to each other, based on the spacing between them. The operations may include welding or merging 1330 two or more glyphs 455 together. In some implementations, the user selects multiple glyphs 455 and selects the weld command 412i to weld or merge the glyphs 455 together into a single resultant glyph 455 having a single cut group. The operation may also include setting a welding gap (e.g., via the weld gap command 510g) between the visual image edges (e.g., Bezier lines) of adjacent glyphs 455. This allows the user to control the amount of any overlapping of the glyphs 455.

The operations may include zooming 1332 in or out on a particular area of the virtual mat 422. In some implementations, to zoom, the user may select one of the zoom commands (in, out) 412d, 412e as well as a location (e.g., point) or area (e.g., clicking to instantiate a zoom window and dragging the zoom window to a specific size) of the virtual mat 422. The operations may include panning 1334 the virtual mat 422, as by selecting one of the panning commands 412f, 426, for example, and dragging a selection pointer across the virtual matt 422 to pan the virtual mat and any images thereon or by selecting arrow buttons for directional panning.

The operations may include cutting 1336 the project (e.g., on an electronic cutting machine 150 in communication with the design software 100) to realize the project 315 in tangible form. The user may select the cut command 425 in the design view to execute a cutting operation on an electronic cutting machine 150. The user may be prompted to save the project 315, if the project 315 was not saved since a last action. A project file for the project 315 can have a header that includes file attributes, such as file name, size, creation date, last save date, etc. The project file can also have data portion that includes glyph group, which lists all of the glyphs forming the design. The glyph group can include attributes such as glyph ID and/or glyph name, cartridge name, and placement properties. The placement properties may include mat location, size, rotation, skew, applied style, etc. In some examples, the project file is an XML (extensible markup language) file. The XML file can have attributes or elements that contain properties of the project 315 (e.g., project name, size, creation date, etc.). Moreover, the XML file can store design information, such as glyphs 455 (or file locations of the glyphs 455), glyph placement (e.g., coordinates), and/or scaled vector graphics (SVG) information. The XML can be encrypted with an encryption key stored on the cloud client 110, versus a user's machine.

In executing the cutting operation 1336, the design software 100 may present the preview view 1100 for the selection of cutting options, such as layers 710 to be cut, multi-cut properties (e.g., number of passes of the cutting blade) of certain layers 710 or the entire project 315, blade pressure, and/or blade speed. The design software 100 may prompt the user to place certain cutting media (e.g., paper) in the electronic cutting machine 150, for example, having a particular color or weight in accordance with the cutting options. The user may also purchase any un-owned content used in the project 315 that would otherwise be precluded from cutting.

In some implementations, the design software 100 executes a conversion routine that converts a visual design of a project 315 into a cuttable design for executing a cutting operation on the electronic cutting machine 150. The conversion routine determines cutting paths for various image lines (e.g., Bezier lines) of the visual design of the project 315 to create a substantial similar cut design. For example, the conversion route may create cuts of various thickness and/or depth to achieve a look substantially similar to the displayed design (e.g., a photo). The conversion routine may merge cutting paths or image lines within a threshold distance of each other into one cut path or image line. The threshold distance may be set by the user or determined based on cutting material type and/or thickness. For example, for typical 20 lb. paper, the threshold distance may be 0.2 mm for merging multiple cutting paths corresponding to image lines into one cutting path. The conversion routine may use Bezier lines forming the design to determine cutting paths. Each Bezier line of the design may be a cutting path and Bezier lines within a threshold distance of each may be merged into one cutting path. The conversion routine can select one of many Bezier lines within an image region having a threshold size to represent all or part of that region. A selected Bezier line can then be used as a cutting path having a set width (as by the width of a selected cutting tool) determined by the user or the conversion program for a particular design region. In some implementations, cutting paths are extrapolated from all or select Bezier lines. Some factors that may be considered during an extrapolation operation include cutting material (type, thickness, etc.) and cutting tool. The conversion routine may also introduce over-cuts (e.g., past an image line end point to make a full cut), under-cuts (e.g., cutting short of an image line end point), angled cuts, and custom cutting paths (e.g., to achieve cutting turns, acute angles, etc.) to achieve cutting a design that substantially resembles a displayed image of the design.

Figure 14A:
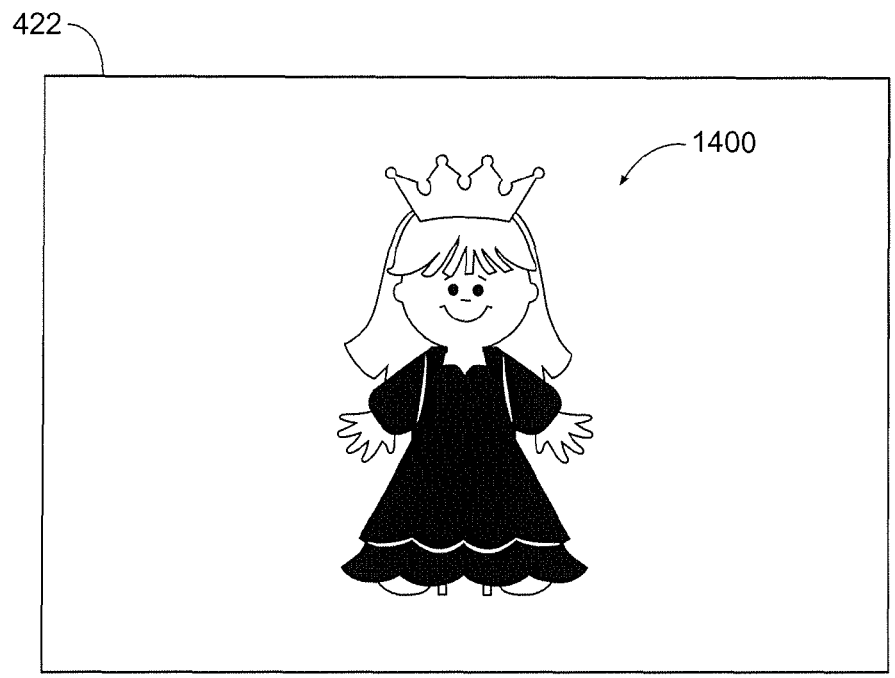
FIG. 14A is a schematic view of a composite design.
Figure 14B:
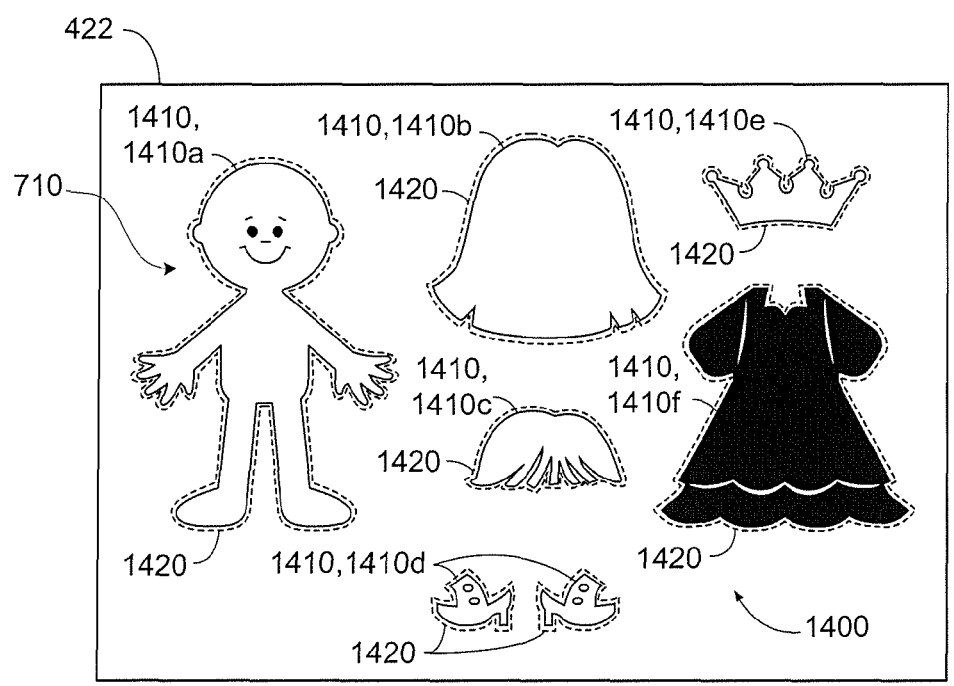
FIG. 14B is a schematic view of component glyphs of the component design of FIG. 14A.

Referring to FIGS. 14A and 14B, in some implementations, additional operations for using the design software 100 include creating layers 710 within a project 315, as by using the layers palette 700, for managing and/or organizing the creation of the project 315. In the example shown, the user may create a design or composite image 1400 on the virtual mat 422 comprised of layers 710 that collectively provide the composite image 1400 visually, and also mechanically during physical assembly of component images 1410 (e.g., as layers 710) cut from a material on the electronic cutting machine 150. The usage of a collection of component images 1410 to form a composite image 1400, digitally and/or physically is referred to herein as image layering and digital paper layering. The user can change an order of the layers 710 (e.g., from front to back) and may specify one or more parameters or commands 712 of each layer 710, when creating the layer 710. For example, the user may select a paper type 712a, set a multi-cut command 712b, a pressure command 712c, and/or a paper size 712d (see e.g., FIG. 7). In some examples, the user can assemble a composite image 1400 on the virtual mat 422 or select a pre-made composite image 1400. The composite image 1400 may be configured or designed by an artist and provided to the user for consumption (e.g., via a cartridge 140 or the Internet). The composite image 1400 may include a home location, which is the location of a vector path that, when all the vectorized component images 1410 arranged in the home location, provides the user the composite image 1400, as shown in FIG. 14A.

When a user initiates a cutting operation or executes an exploded view operation 720, the composite image 1400 is exploded into the non-overlapping component images 1410 for cutting and later assembly, as shown in FIG. 14B. In some implementations, separate component image files corresponding to each component image 1410 are used for providing the exploded view, while in other implementations, the component images 1410 are created or extrapolated from the composite image 1400 (e.g., via segmenting the image). In the example shown, the composite image 1400 is assembled from a body component image 1410a, a first hair component image 1410b, a second hair component image 1410c, a shoes component image 1410d, a crown component image 1410e, and a dress component image 1410f. Each component image 1410 can be on a separate layer 710. If the composite image 1400 is cropped, the corresponding component images 1410 may be cropped accordingly. A semi-composite state of the composite image 1400 may be provided where the component images 1400 can be arranged with overlapping and non-overlapping vector paths. Moreover, the user may specify where a layer 710 is cut, print, or print and cut layer (e.g., via layer attribute(s))

In some examples, the user may recolor, flood fill, paint, shade, texture, other otherwise alter all or parts of the composite image 1400, layer 710, and/or any of the corresponding component images 1410 so as to customize the look of the image(s) 1400, 1410. In shading, for example, the user may altering the color of raster art to make it a different color while maintaining the shading of the raster art. In texture filling, the user may remove the raster art from inside a vector border and replacing it with a pattern.

Referring again to FIG. 14B, each component image 1410 may have a vector region, which is an area created by the boundary of a vector path. In some implementations, a buffer region 1420 is disposed around the perimeter or boundary of the vector path of the component image 1410. For example, the design software 100 may automatically provide the buffer region 1420 around each component image 1410 upon execution of a cut command 425 or the user may select a bleed boundary command 730 (FIG. 7) to create the buffer region 1420 around the component image(s) 1410 of a selected layer 710. The buffer region 1420 allows cutting the component image 1410 along its perimeter while maintaining any coloration (e.g., via printing) of component image 1410 completely up to the cut perimeter. The buffer region 1420 may have a threshold thickness that stays constant or is not exceeded (e.g., maximum or minimum) when the component image 1410 is scaled or altered. In some implementations, the buffer region 1420 is created by extrapolating colors outwardly beyond the image perimeter. For example, pixel colors may be propagated a threshold number of pixels outwardly form the image perimeter and overlapping colors mixed appropriately (e.g., according to a mixing criteria, such red+blue=purple).

Table 1 provides example use cases that illustrate various operations that can be performed on composite images 1400 (full and semi-composite state of the composite image 1400) and/or component images 1410. Other uses are possible as well. In some examples, the user may wish to execute a machine operation, such a print operation, a cut operation, or a print and cut operation from the design software 100 to realize a design in physical form. The user may also execute one or more image manipulation operations on the composite images 1400 (full and semi-composite state of the composite image 1400) and/or component images 1410 before executing the machine operation.

TABLE 1

|  | Composite | Semi-Composite | Exploded |
| --- | --- | --- | --- |
| Print and Cut | Alter the image, print and cut, peel and use. Alter the image, flood fill some/all vector regions, print and cut, peel and use. Alter the image, shade fill some/all vector regions, print and cut, peel and use. Alter the image, texture fill some/all vector regions, print and cut, peel and use. | Alter the image, move some/all vector regions, print and cut, peel, layer if desired and use. Alter the image, move some/all vector regions, flood fill some/all vector regions, print and cut, peel, layer if desired and use. Alter the image, move some/all vector regions, shade fill some/all vector regions, print and cut, peel, layer if desired and use. Alter the image, move some/all vector regions, texture fill some/all vector regions, print and cut, peel, layer if desired and use. Additionally - vector regions could be deleted. | Alter the image, explode the image, print and cut, peel, layer if desired and use. Alter the image, explode the image, flood fill some/all vector regions, print and cut, peel, layer if desired and use. Alter the image, explode the image, shade fill some/all vector regions, print and cut, peel, layer if desired and use. Alter the image, explode the image, texture fill some/all vector regions, print and cut, peel, layer if desired and use. Additionally - vector regions could be deleted. |
| Print | Alter the image, print, peel and use. Alter the image, flood fill some/all vector regions, print, peel and use. Alter the image, shade fill some/all vector regions, print, peel and use. Alter the image, texture fill some/all vector regions, print, peel and use. | Alter the image, move some/all vector regions, print, peel, layer if desired and use. Alter the image, move some/all vector regions, flood fill some/all vector regions, print, pea, layer if desired and use. Alter the image, move some/all vector regions, shade fill some/all vector regions, print, peel, layer if desired and use. Alter the image, move some/all vector regions, texture fill some/all vector regions, print, peel, layer if desired and use. Additionally - vector regions could be deleted. | Alter the image, explode the image, print, peel, layer if desired and use. Alter the image, explode the image, flood fill some/all vector regions, print, peel, layer if desired and use. Alter the image, explode the image, shade fill some/all vector regions, print, peel, layer if desired and use. Alter the image, explode the image, texture fill some/all vector regions, print, peel, layer if desired and use. Additionally - vector regions could be deleted. |

TABLE 1-continued

| | Composite | Semi-Composite | Exploded |
|---|---|---|---|
| Cut | Alter the image, select the paper, cut, peel and use. | Alter the image, move some/all vector regions, select the paper, cut, peel, layer if desired and use. | Alter the image, explode the image, select the paper, cut, peel, layer if desired and use. |

The user may alter or manipulate the image in any number of ways, including, but not limited to: sizing, flipping, rotating, shading, filling, painting, skewing, patterning, etc.

Additional details on image layering and other features combinable with this disclosure can be found in U.S. Provisional Patent Application Ser. No. 61/178,074, filed on May 14, 2009 as well as U.S. Provisional Patent Application Ser. No. 61/237,218, filed on Aug. 26, 2009. The disclosures of these prior applications are considered part of the disclosure of this application and are hereby incorporated by reference in their entireties.

Figure 15:
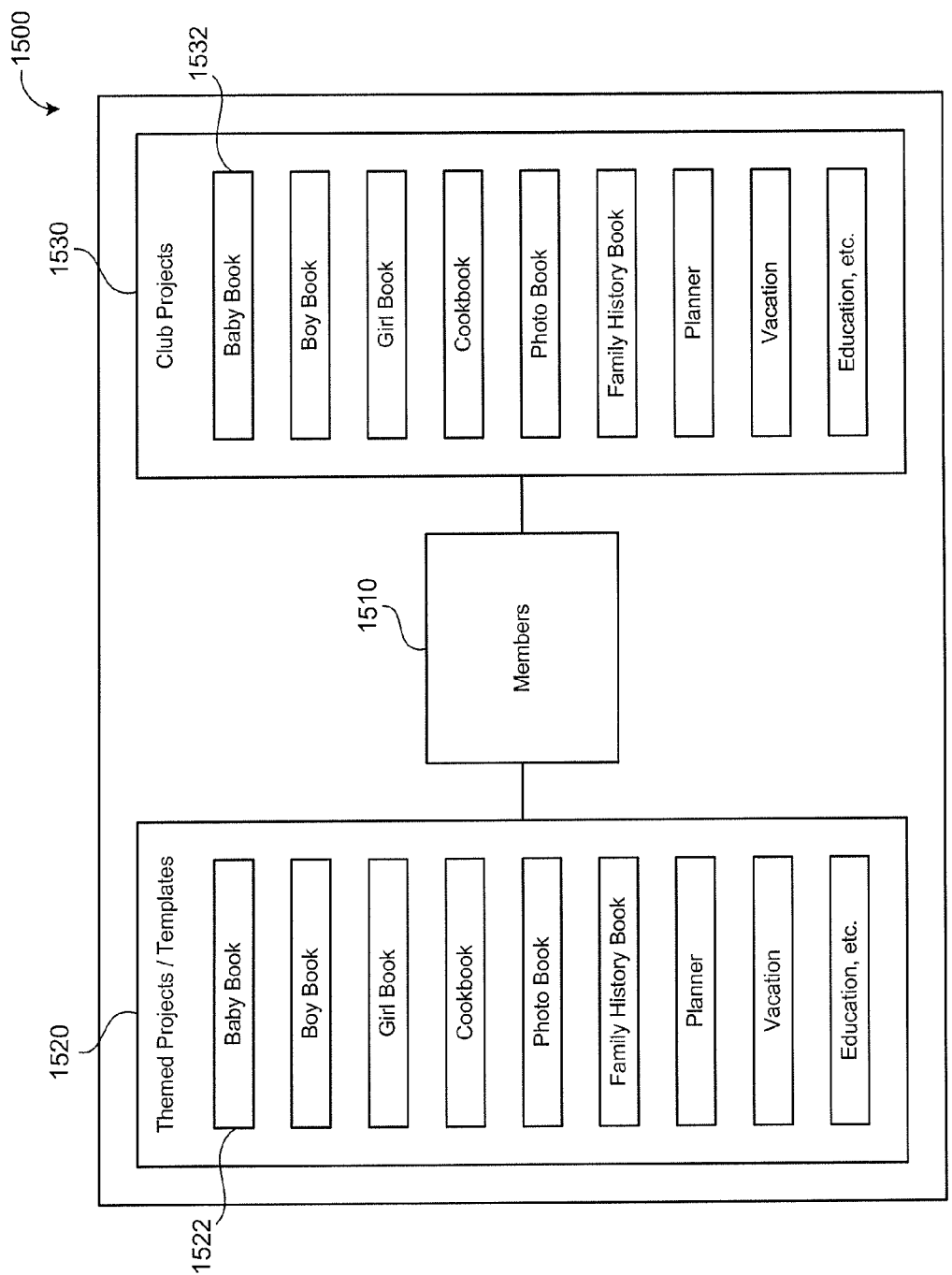
FIG. 15 is a schematic view of a club portion of a rich internet application that provides access to themed projects or templates and member projects published by members of the club.

FIG. 15 is a schematic view of a club portion 1500 of the design software 100 (e.g., a rich internet application). The club portion 1500 includes a members portion 1510 which may be an aggregation of members (i.e., users) for reference to maintain controlled access to the club portion 1500. In some implementations, member information, such as username, password, and contact information, is stored in a table of a relational database or in some other data structure, such as a Java Script Object Notation (JSON) object. Members may join the club portion 1500 through a subscription service (e.g., reoccurring payments) or one-time activation. The members can have limited or unlimited access to various portions of the design software 100 based on a subscription level. For example, the members may have access to certain libraries or collections of glyphs 455 (e.g., glyph collections of various cartridges 140).

The club portion 1500 may also include a themed project/template portion 1520 that includes one or more themed projects/templates 1522. The themed projects/templates 1522 include an initial layout or design of glyphs 455 or placeholders for glyphs 455 for later customization and/or completion by the user. Examples of themes for the themed projects/templates 1522 include baby books, boy books, girl books, cookbooks, photo books, family history books, planners, vacation books, educational books, etc.

In some implementations, the members can modify existing or create their own themed projects/templates 1532 and publish them to a club projects portion 1530 of the design software 100. Club members can access the club projects portion 1530 to view the published member projects/templates 1532, which may be offered for sale by the creators. The design software 100 may assess a service fee for all sales of member projects/templates 1532 from one member to another. Moreover, the design software 100 may offer purchased access to collections of glyphs 455 used in the themed projects/templates 1522 and/or the published member projects/templates 1532.

Referring again to FIG. 8, in some implementations, the design software 100 allows the user to rank content. For example, when viewing glyphs 455 or collections of glyphs 455 (e.g., cartridges 140), the user may assign a ranking 855 to each glyph 455 and/or or glyph collection (cartridges 140). After receiving the ranking 855 from the user, the design software 100 can statistically analyze rankings 855 across one or more libraries or collections of glyphs 455 and determine which types of glyphs 455 are favored over others by the user. Moreover, the design software 100 may statistically analyze rankings 855 from many users to determine which glyphs 455 and/or or glyph collections (cartridges 140) are favored over others. The statistical information can b used for the marketing purposes and/or for the development of future content.

Figure 16:
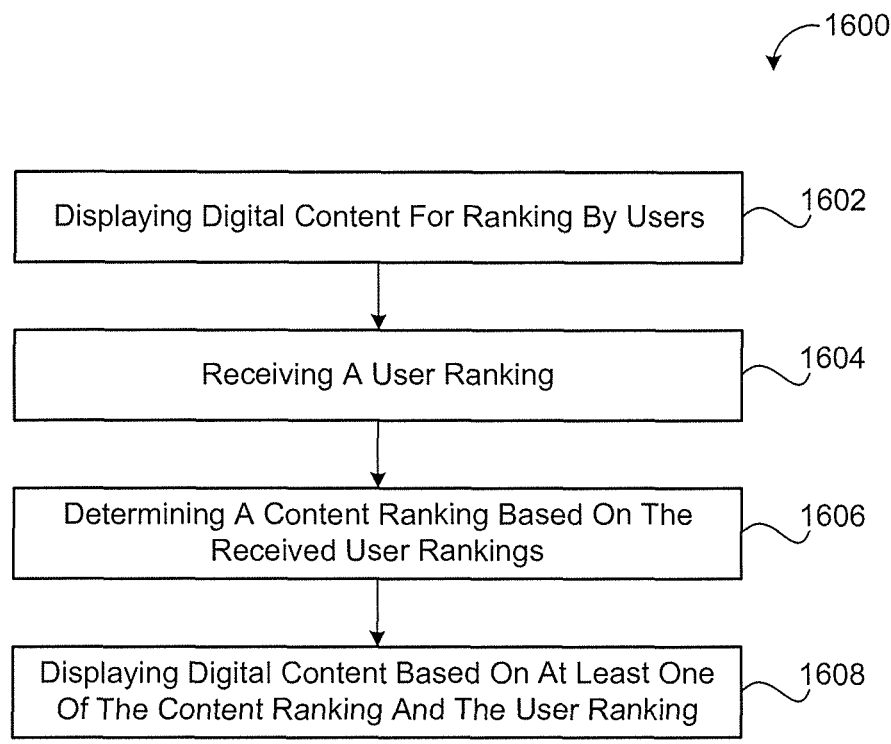
FIG. 16 provides a schematic view of an exemplary arrangement of operations for delivering digital content for use on an electronic cutting machine.

FIG. 16 provides a schematic view of an exemplary arrangement of operations for delivering digital content for use on an electronic cutting machine. In some implementations, the operations include displaying 1602 digital content (e.g., glyphs 455 and/or or glyph collections (cartridges 140)) for ranking by users and receiving 1604 a user ranking 855 for the digital content by each of the users. The digital content can be displayed in a rich internet application 100 over a network. For example, the operations may include executing the rich internet application 100 on a cloud client 110 of a cloud computing scheme. The operations further include determining 1606 a content ranking 865 for the digital content based on the received user rankings 855 and displaying 1608 digital content to each user based on at least one of the content ranking 865 and the user ranking 850 of the respective user. In some examples, the operations include statistically analyzing the user rankings 855 for determining the content ranking 865. The operations may include tracking the browsing and/or usage of the digital content for creating projects 315 (e.g., designs) and delivering the digital content (e.g., visually) to the user based on past usage of similar content (e.g., by category, keyword, etc.). In some examples, the operations include displaying marketing information (e.g., in the marketing section 330) based on at least one of the user ranking 855, content ranking 865, and the past usage of the digital content.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method, comprising:
delivering digital content for use on an electronic cutting machine by:
displaying at least one themed project in a rich internet application;
permitting access to non-purchased content over a network, wherein the non-purchased content includes at least one glyph of a glyph collection;
permitting access to the non-purchased content for creating a design including the non-purchased content;
after the design including accessed non-purchased content has been created, initiating a cutting operation on the electronic cutting machine for cutting the created design that includes the accessed non-purchased content;
prior to executing the initiated cutting operation, communicating with the rich internet application for verifying if the accessed, non-purchased content is associated with a purchased ownership status;
responsive to verifying that the accessed non-purchased content has not yet been associated with the purchased ownership status, subsequently:
offering to associate the purchased ownership status with the accessed non-purchased content and responsive to the offering step:
permitting execution of the initiated cutting operation for cutting the design including the accessed non-purchased content when the offering step is accepted, and
prohibiting execution of the initiated cutting operation for cutting the design including the accessed non-purchased content when the offering step is declined.

2. The method of claim 1, further comprising executing the rich internet application on a cloud client of a cloud computing scheme.

3. The method of claim 2, further comprising
delivering digital content on demand to the rich internet application from the cloud client.

4. The method of claim 1, wherein the themed project comprises an arrangement of at least one of glyphs and placeholders for glyphs according to a theme, wherein any glyphs of the glyph collection can be added to the themed project, the themed project being cuttable on an electronic cutting machine in communication with the rich internet application.

5. The method of claim 1, further comprising
providing at least one design creation tool in the rich internet application for editing the themed project.

6. The method of claim 5, wherein executing the at least one design creation tool comprises at least one of cutting, copying, pasting, kerning for moving glyphs together, glyph welding for merging glyphs together, glyph sizing, glyph orienting, glyph slanting, glyph grouping, glyph ungrouping, glyph compositing for combining sub-glyphs into a single glyph, glyph exploding for breaking a glyph into constituent sub-glyphs, glyph flipping about an axis, glyph layering, glyph shadowing, and setting a glyph border.

7. The method of claim 1, wherein the at least one themed project is in the form of an XML file that is delivered during the delivering step from a cloud client to the electronic cutting machine.

8. The method of claim 7, wherein the at least one themed project that is displayed in the rich internet application includes the non-purchased content.

9. The method of claim 8 further comprising executing the rich internet application on the cloud client of a cloud computing scheme.

10. The method of claim 9, wherein the XML file is encrypted with an encryption key stored on the cloud client.

11. The method of claim 10, wherein the XML file is not encrypted with the encryption key on the electronic cutting machine.

12. The method of claim 7, wherein the XML file contains one or more properties of the at least one themed project, wherein the one or more properties includes one or more of a project name, a project size and a project creation date.

13. The method of claim 7, wherein the XML file stores design information including scaled vector graphics information.

14. The method of claim 7, wherein the XML files stores design information including one or more of: at least one glyph, one or more file locations of the at least one glyph and one or more glyph coordinates.

15. A method, comprising:
delivering digital content including at least one themed project in the form of an XML file from a cloud client to an electronic cutting machine by:
displaying the at least one themed project in a rich internet application;
permitting access to non-purchased content of the at least one themed project over a network, wherein the non-purchased content includes at least one glyph of a glyph collection;
permitting access to the non-purchased content for creating a design including the non-purchased content;
after the design including accessed non-purchased content has been created, initiating a cutting operation on the electronic cutting machine for cutting the created design that includes the accessed non-purchased content;
prior to executing the initiated cutting operation, communicating with the rich internet application for verifying if the accessed, non-purchased content is associated with a purchased ownership status;
responsive to verifying that the accessed non-purchased content has not yet been associated with the purchased ownership status, subsequently:
offering to associate the purchased ownership status with the accessed non-purchased content and responsive to the offering step:
permitting execution of the initiated cutting operation for cutting the design including the accessed non-purchased content when the offering step is accepted, and
prohibiting execution of the initiated cutting operation for cutting the design including the accessed non-purchased content when the offering step is declined.

16. The method of claim 15, further comprising executing the rich internet application on a the cloud client of a cloud computing scheme.

17. The method of claim 16, wherein the XML file is encrypted with an encryption key stored on the cloud client.

18. The method of claim 17, wherein the XML, file is not encrypted with the encryption key on the electronic cutting machine.

19. The method of claim 16, further comprising
  delivering digital content on demand to the rich internet application from the cloud client.

20. The method of claim 15, wherein the themed project comprises an arrangement of at least one of glyphs and placeholders for glyphs according to a theme, wherein any glyphs of the glyph collection can be added to the themed project, the themed project being cuttable on an electronic cutting machine in communication with the rich internet application.

21. The method of claim 15, further comprising
  providing at least one design creation tool in the rich internet application for editing the themed project.

22. The method of claim 19, wherein executing the at least one design creation tool comprises at least one of cutting, copying, pasting, kerning for moving glyphs together, glyph welding for merging glyphs together, glyph sizing, glyph orienting, glyph slanting, glyph grouping, glyph ungrouping, glyph compositing for combining sub-glyphs into a single glyph, glyph exploding for breaking a glyph into constituent sub-glyphs, glyph flipping about an axis, glyph layering, glyph shadowing, and setting a glyph border.

23. The method of claim 15, wherein the XML file stores design information including scaled vector graphics information.

24. The method of claim 15, wherein the XML, files stores design information including one or more of: at least one glyph, one or more file locations of the at least one glyph and one or more glyph coordinates.

* * * * *